US010170134B2

(12) United States Patent
Markovich Golan et al.

(10) Patent No.: US 10,170,134 B2
(45) Date of Patent: Jan. 1, 2019

(54) METHOD AND SYSTEM OF ACOUSTIC DEREVERBERATION FACTORING THE ACTUAL NON-IDEAL ACOUSTIC ENVIRONMENT

(71) Applicant: Intel IP Corporation, Santa Clara, CA (US)

(72) Inventors: Shmuel Markovich Golan, Ramat Hasharon (IL); Alejandro Cohen, Gan Yavne (IL)

(73) Assignee: Intel IP Corporation, Santa Clara, CA (US)

( * ) Notice: Subject to any disclaimer, the term of this patent is extended or adjusted under 35 U.S.C. 154(b) by 4 days.

(21) Appl. No.: 15/438,497

(22) Filed: Feb. 21, 2017

(65) Prior Publication Data

US 2018/0240471 A1 Aug. 23, 2018

(51) Int. Cl.

| | |
|---|---|
| ***H04B 3/20*** | (2006.01) |
| ***G10L 21/0232*** | (2013.01) |
| ***H04R 3/00*** | (2006.01) |
| ***G10L 21/02*** | (2013.01) |
| ***H04S 7/00*** | (2006.01) |
| *G10L 21/0208* | (2013.01) |

(52) U.S. Cl.

CPC ...... *G10L 21/0232* (2013.01); *G10L 21/0205* (2013.01); *H04R 3/005* (2013.01); *H04S 7/305* (2013.01); *G10L 2021/02082* (2013.01); *H04S 2400/01* (2013.01)

(58) Field of Classification Search

USPC .... 381/61, 63, 64, 66, 71.1, 71.2, 71.9, 94.1

See application file for complete search history.

(56) References Cited

U.S. PATENT DOCUMENTS

2016/0118038 A1* 4/2016 Eaton .................... G10K 15/08 381/63

OTHER PUBLICATIONS

NPL Document Patrick A. Naylor Oct. 2009.*

Avargel, Y et al., "System Identification in the Short-Time Fourier Transform Domain with Crossband Filtering", IEEE Transactions on Audio, Speech, and Language Processing, vol. 15, No. 4, May 2007 p. 1305-1319.

Bertrand, A et al., "Distributed Node-Specific LCMV Beamforming in Wireless Sensor Networks", IEEE Transactions on Signal Processing, vol. 60, No. 1, Jan. 2012 p. 233-246.

Cohen, I, "Relative Transfer Function Identification Using Speech Signals", IEEE Transactions on Speech and Audio Processing, vol. 12, No. 5, Sep. 2004.

Cohen, I et al., "Speech Enhancement for Non-Stationary Noise Environments", Lamar Signal Processing Ltd., P.O. Box 573, Yokneam Ilit 20692, Israel, Signal Processing 81 (2001) pp. 2403-2418.

Dal Degan, N et al., "Acoustic noise analysis and speech enhancement techniques for mobile radio applications", Signal Processing, vol. 15, No. 1, pp. 43-56, 1988.

(Continued)

*Primary Examiner* — Yosef K Laekemariam

(74) *Attorney, Agent, or Firm* — Green, Howard & Mughal LLP

(57) ABSTRACT

A system, article, and method of acoustic dereverberation factoring the actual non-ideal acoustic environment.

24 Claims, 10 Drawing Sheets

(56) References Cited

OTHER PUBLICATIONS

Delcroix, M. et al., "Defeating reverberation: Advanced dereverberation and recognition techniques for hands-free speech recognition", Proceedings of the 2014 IEEE Global Conference on Signal and Information Processing (GlobalSIP 2014), pp. 685-689, Dec. 2014.
Eaton, J et al., "Direct-to-Reverberant Ratio Estimation Using a Null-Steered Beamformer", Imperial College London, ICASSP, Brisbane, Australia, Apr. 22, 2015, 25 pages.
Gannot, S et al., "Signal Enhancement Using Beamforming and Nonstationarity with Applications to Speech", IEEE Transactions on Signal Processing, vol. 49, No. 8, Aug. 2001 p. 1614-1626.
Habets, E et al., "Generating sensor signals in isotropic noise fields", The Journal of the Acoustical Society of America, vol. 122, No. 6, pp. 3464-3470, 2007.
Habets, E et al., "Joint Dereverberation and Residual Echo Suppression of Speech Signals in Noisy Environments", IEEE Transactions on Audio, Speech, and Language Processing, vol. 16, No. 8, Nov. 2008 pp. 1433-1451.
Habets, E, "Single-Channel Speech Dereverberation based on Spectral Subtraction", Technische Universiteit Eindhoven, Department of Electrical Engineering, Signal Processing Systems Group, EH 3.27, P.O. Box 513, 5600 MB Eindhoven, The Netherlands p. 250-254.
Kinoshita, K. et al., "A summary of the REVERB challenge: state-of-the-art and remaining challenges in reverberant speech processing research", EURASIP Journal on Advances in Signal Processing, vol. 2016, No. 1, (2016), pp. 1-19.
Markovich, S et al., "Multichannel Eigenspace Beamforming in a Reverberant Noisy Environment with Multiple Interferring Speech Signals", IEEE Transactions on Audio, Speech, and Language Processing, vol. 17, No. 6, Aug. 2009 p. 1071-1086.
Markovich-Golan, S et al., "Performance Analysis of the Covariance Subtraction Method for relative Transfer Function Estimation and Comparison to the Covariance Whitening Method", 2015 IEEE International Conference on Acoustics, Speech and Signal Processing (ICASSP). IEEE, 2015, pp. 544-548.
Nakatani, T et al., "Blind Speech Dereverberation with Multi-Channel Linear Prediction Based on Short Time Fourier Transform Representation", NTT Communication Science Labs., NTT Corporation, Kyoto, Japan, School of ECE, Georgia Institute of Technology, GA, USA pp. 85-88.
Naylor, P et al., "Signal-Based Performance Evaluation of Dereverberation Algorithms", Hindawi Publishing Corporation, Journal of Electrical and Computer Engineering, vol. 2010, Article ID 127513, 5 pages, doi:10.1155/2010/127513.
Povey, D et al., "The Kaldi Speech Recognition Toolkit", Microsoft Research, USA; Saarland University, Germany; Centre de Recherché Informatique de Montreal, Canada; Brno University of Technology, Czech Republic; SRI International, USA; Go-Vivace Inc., USA; IDIAP Research Institute, Switzerland, 4 pages.
Schroeder, M, "Frequency-correlation functions of frequency responses in rooms", Journal of the Acoustical Society of America, vol. 34, No. 12, pp. 1819-1823, 1962.
Schwartz, O et al., "Multi-Microphone Speech Dereverberation and Noise Reduction Using Relative Early Transfer Functions", IEEE/ACM Transactions on Audio, Speech, and Language Processing, vol. 23, No. 2, Feb. 2015, pp. 240-251.
Souden, M et al., "On Optimal Beamforming for Noise Reduction and Interference Rejection", 2009 IEEE Workshop on Applications of Signal Processing to Audio and Acoustics, Oct. 18-21, 2009, New Paltz, NY.
Talmon, R et al., "Convolutive Transfer Function Generalized Sidelobe Canceler", IEEE Transactions on Audio, Speech, and Language Processing, vol. 17, No. 7, Sep. 2009, pp. 1420-1434.
Talmon, R et al., "Relative Transfer Function Identification Using Convolutive Transfer Function Approximation", IEEE Transactions on Audio, Speech, and Language Processing, vol. 17, No. 4, May 2009 p. 546-555.
Taseska, M et al., "MMSE-Based Blind Source Extraction in Diffuse Noise Fields Using a Complex Coherence-Based a Priori SAP Estimator", International Workshop on Acoustic Signal Enhancement 2012, Sep. 4-6, 2012, Aachen.
Yoshioka, T. et al., "Blind Separation and Dereverberation of Speech Mixtures by Joint Optimization", IEEE Transactions on Audio, Speech, and Language Processing, vol. 19 Issue 1, Jan. 2011, p. 69-84, IEEE Press Piscataway, NJ, USA.
Yoshioka, T. et al., "Generalization of Multi-Channel Linear Prediction Methods for Blind MIMO Impulse Response Shortening", IEEE Transactions on Audio, Speech, and Language Processing archive vol. 20 Issue 10, Dec. 2012 p. 2707-2720 IEEE Press Piscataway, NJ, USA.

* cited by examiner

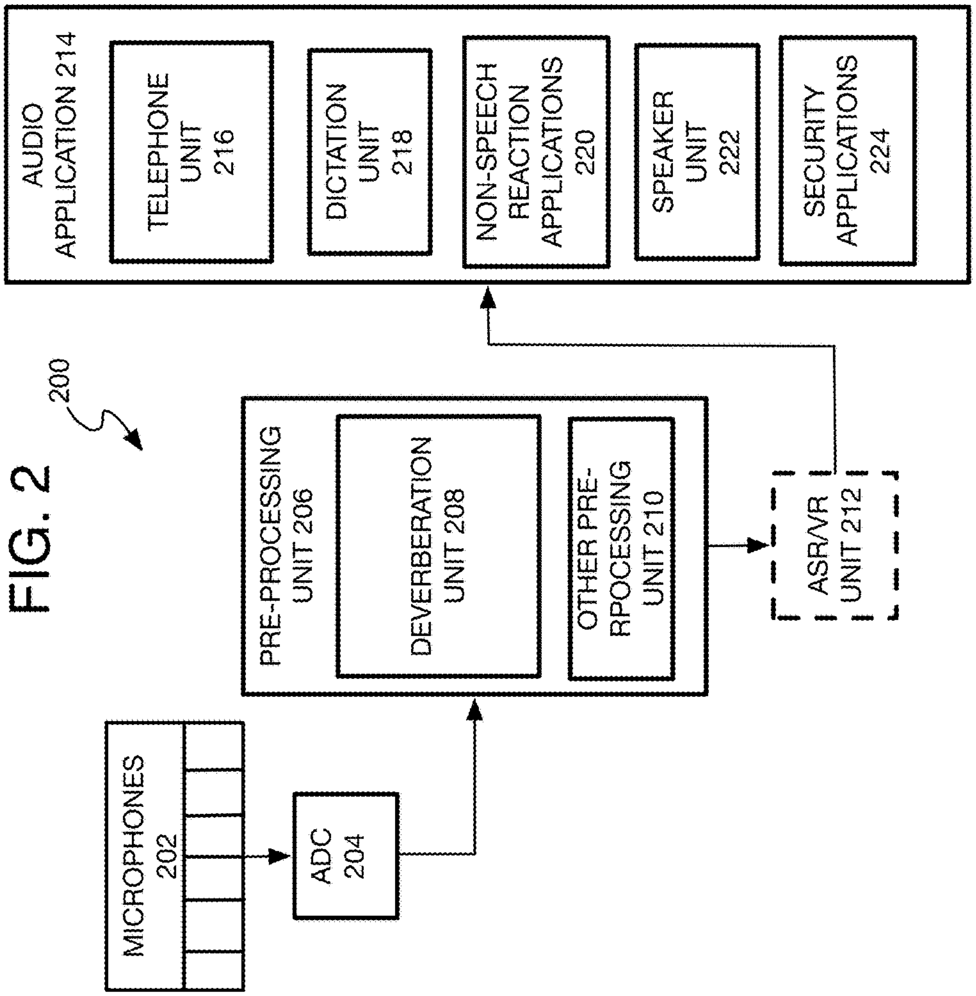
FIG. 2
FIG. 3
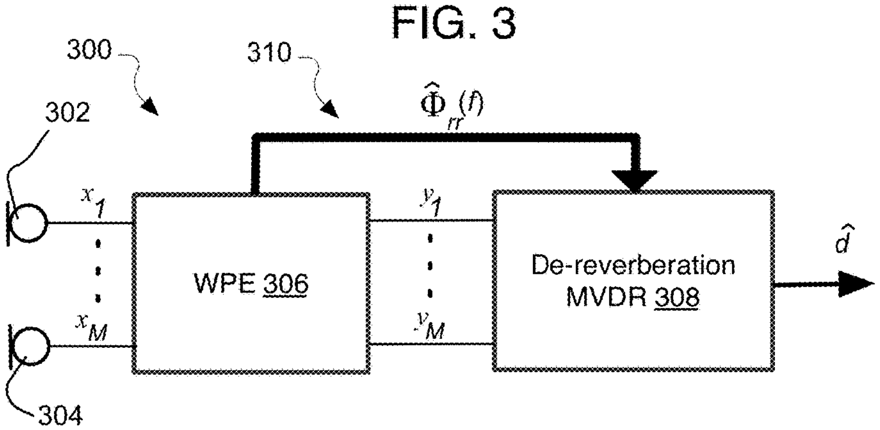

METHOD AND SYSTEM OF ACOUSTIC DEREVERBERATION FACTORING THE ACTUAL NON-IDEAL ACOUSTIC ENVIRONMENT

BACKGROUND

Many computer devices use automatic speech recognition (recognition of the words and the definition of the words being spoken) and speaker recognition (recognition of the speaker) such as on smartphones, tablets, automobile audio systems, smart houses and so forth. Thus, receiving a clear audio signal on these systems is very important. One or more microphones may be used on a device with an audio system to receive the acoustic waves from a person speaking. The microphone(s) then receive both direct sound waves and reverberated sound waves that reflect off of nearby walls and objects in an area with both the sound source and the receiving microphone(s). When the speaker is holding a phone to his/her ear to speak on the phone and so that the microphone(s) on the phone are within a mere couple of inches of the person's mouth, the interference from reverberation is usually insignificant. When a person, however, holds the phone relatively far away from his/her mouth such as when placed down on a counter or on no hands-mode within an automobile, the signal to noise ratio (SNR) and direct to reverberant ratio (DRR) can be very low such that operation of the applications that use the signal may provide low quality results.

Many systems perform dereverberation to remove the reverberations and make the speech signal clearer. The conventional dereverberation which treats reverberation as an independent interference, however, is often inadequate due to a failure to effectively consider the actual acoustic environment. The acoustic environment is affected by the objects forming the acoustic space, such as walls, and by spatial shading which is the position of objects in the acoustic environment that block an acoustic transmission path from source to microphone. The acoustic environment also may be considered to include physical (such as position) and frequency response variations of the microphone and non-uniform reverberation fields.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a schematic diagram of an audio processing system with a dereverberation unit according to the implementations herein;

FIG. 3 is a schematic diagram of a dereverberation unit for an audio processing system according to the implementations herein;

DETAILED DESCRIPTION

Figure 1A:
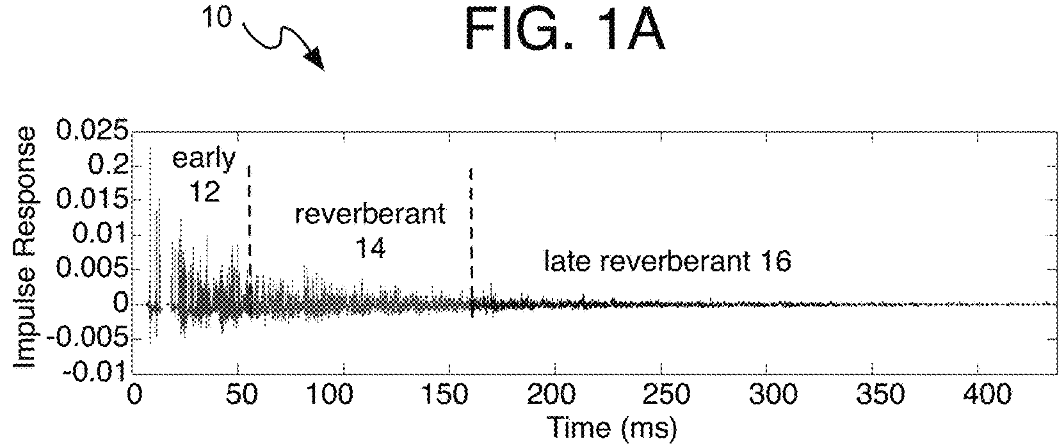
FIG. 1A is a graph of an example acoustic impulse response and indicating the components that form the impulse response.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptop or desktop computers, tablets, mobile devices such as smart phones, video game panels or consoles, high definition audio systems, surround sound or neural surround home theatres, television set top boxes, on-board vehicle systems, dictation machines, security and environment control systems for buildings, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of acoustic dereverberation factoring the actual non-ideal acoustic environment.

In recent years, performances of automatic speech recognition (ASR) methods have improved remarkably thanks to algorithmic and technological advances such that ASR is a fundamental function of many computing devices such as smartphones, tablets, and so forth. The quality remains high as long as the speaker's mouth is very close to the microphones on the devices. Yet, distant speech recognition where a speech source, or person speaking, may be at a relatively large distance away from the microphones, such as greater than 1 meter, remains a challenge as conventional ASR methods degrade dramatically in this case due to reduced signal to noise ratio (SNR) and direct speech to reverberant ratio (DRR or SRR).

In order to provide sufficiently clear speech signals when the source is at a relatively large distance from the microphone(s), the microphones should be configured such that their signals are spatially diverse in varying types of acoustic environments. Spatial diversity refers to different impulse responses and acoustic transfer functions from the speech source to the microphones, manifested in variations of amplitude and phase responses between the microphones. The spatial diversity is influenced by the mechanical structure of the system and by the arrangement of the objects and their materials in the acoustic environment. Thus, spatial arrangement of the acoustic environment may include objects that form the environment as well as objects within the environment. This may include the walls, floor, and ceiling that form a room if the environment is a room. Alternatively, it could be outside in the open air where the only large surface forming the environment is the ground. Otherwise, the objects in the environment may be furniture, fixtures such as counters and cabinets, and so forth, but can also include the speaker's body itself as well as the surfaces of the audio equipment or receiving device, such as a smartphone or stand-alone microphone. Any object in or forming the acoustic environment that causes shading and/or anything that may be impacted by a sound wave and reflect the sound wave from a surface is considered an object in the acoustic environment. The farther away the source is from the receiving device, the more objects may block the paths from the source to the receiver causing more reverberations.

Referring to FIG. 1A, it also follows then that the farther away the source is from the receiving device (s), the more the audio signals may be affected by the spatial acoustic environment because more reverberations from objects in the environment may dominate a larger part of the audio signal such as in an impulse response (IR). An example IR 10 is graphed to show the timing of the reverberations and with the x-axis as time and the y-axis as amplitude. The early component 12 of the IR contains the direct and early reflections of the person speaking. This is the desired component that a speech processing system should output. Early reflections are also considered desired as they have small delays compared to the direct arrival component and therefore tend to increase speech power and intelligibility. Higher order reflections correspond to reflections bouncing off multiple objects and walls before reaching the microphones. These reflections are received by the microphones after the early reflections, and are referred to as reverberant or reverberation components 14, and late or residual components 16. Considering conventional de-correlation based dereverberation methods, the major part of the reverberant component 14 is the portion of the reverberation that the dereverberation algorithm typically can account for. Correspondingly, residual component 16 is the portion of the IR that is not reduced by the dereverberation algorithm when miss-modelling or estimation errors occur. Practically, residual reverberation components are inevitable in any dereverberation scheme. It should be noted that the term acoustic will be used to generally apply to sound waves before and at input to the microphones.

Thus, it can be stated that one purpose of the dereverberation is to remove the reverberant components of the IRs, thereby enhancing the early component of the IR. Two different dereverberation paradigms are to either treat the reverberation as a long-term correlative signal, i.e., reflections are considered as delayed and attenuated replica of the speech source, or treat the reverberations as noise comprising a large number of statistically independent sources and that are independent from the direct speech source.

The weighted prediction error (WPE) reverberation filtering method adopts the first paradigm. For WPE dereverberation, the signals are processed in the short-time Fourier transform (STFT) domain, and a criterion combining the reverberation model as correlation of the current frame to previous frames (corresponding to late components in the IR) and a linear prediction coefficient (LPC) model for the dry speech is optimized in an iterative procedure. See, Yoshikoa et al. "Blind separation and dereverberation of speech mixtures by joint optimization," IEEE Trans. Audio, Speech and Language Processing, vol. 19, no. 1, pp. 69-84 (2011); and Yoshikoa et al., "Generalization of multi-channel linear prediction methods for blind MIMO impulse response shortening," IEEE Trans. Audio, Speech and Language Processing, vol. 20, no. 10, pp. 2707-2720 (2012). Other details are provided below as well. While WPE dereverberation reduces the reverberations in the signals, and mainly the reverberant (middle) component of the IR, it could be improved to provide a cleaner signal for more accurate speech recognition that more sufficiently removes the late component of the IR as well. The reverberation remaining in the output of the WPE is referred to herein as the residual reverberation.

As to the second paradigm, it is common to model the sound-field of the late reverberations as a diffuse sound-field, i.e., an infinite number of independent omnidirectional sources uniformly spaced on a sphere surrounding the microphone array and propagating in free-space. Further assuming that the microphones have ideal omnidirectional spatial response, and that their frequency responses are equal, the components of the late reverberations at the microphone signals exhibit ideal diffuse-noise characteristics. Yet, practical conditions such as a non-uniform reverberation field (due to asymmetry of the enclosure, obstacles, materials with different reflections coefficients and positions of the source and array), and discrepancies in the microphones' spatial-responses (due to the device mechanical structure and different shading of microphones) and in their unequal frequency-responses (defined in the microphones' specifications), result in a non-ideal diffuse characteristics of the late-reverberations at the microphone signals.

Thus, in the second paradigm, the reverberation is modeled as a diffuse noise field. In this case, a minimum variance distortionless response (MVDR) superdirective beamformer may be applied in the STFT domain to reduce reverberations. A steering vector towards the desired speaker may be defined using the early component of the impulse responses (IRs). The relative early impulse responses are estimated by: a) dereverberating the microphone signals using a single channel Wiener filter; b) estimating the relative transfer function of the remaining speech components. See, Schwartz et al., "Multimicrophone speech dereverberation and noise reduction using relative early transfer functions," IEEE/ACM Transactions on Audio, Speech, and Language Processing, vol. 23, no. 2, pp. 240-251 (2015).

It has been proposed to use the MVDR after WPE to reduce noise. See, K. Kinoshita et al., "A summary of the REVERB challenge: state-of-the-art and remaining challenges in reverberant speech processing research," EURASIP Journal on Advances in Signal Processing, vol. 2016, no. 1, pp. 1-19 (2016). This combination, however, has still proven inadequate to provide sufficient dereverberation for speech recognition. In other words, the output signal of the MDVR beam former after WPE here also is not sufficiently clean of reverberations because the dereverberation methods are still based on a theoretical or a controlled acoustic environment rather than the real actual acoustic environment.

To improve dereverberation performance, two paradigms are combined in a different way. At a first stage, a multiple-input multiple-output (MIMO) version of WPE is used, yielding a dereverberated version of the speech signal for each of the microphones. The enhanced output signals at this first WPE stage still comprise a residual reverberant component, which is then reduced in a second stage MVDR beamformer used for dereverberation.

It has been found that the spatial properties of the residual reverberation are similar to the spatial properties of the reverberation at the microphones, which ideally follow a diffuse field model. The acoustic environment, including microphone position errors, non-uniform reverberation field, shading of objects in the room including the receiving device itself, and diverse frequency responses of the microphones, affects the accuracy of the theoretical diffuse field. Herein, the coherence of the reverberant components at the microphones, which reflects the actual reverberation-field affected by the above mentioned discrepancies, is used to model the coherence of the residual reverberant component at the output of the first stage and to construct the second stage MVDR. The reverberant components are linearly predicted during the first stage WPE dereverberation. The coherence of the reverberant components of the speech is estimated by long-term covariance averaging and then used to model the coherence of the residual reverberations components. Along with estimates of the covariance matrix of the speech components at the output of the first stage (early and residual reverberant components), the estimated coherence of the residual reverberations components is then used in estimating the relative transform function (RTF). To that end, a covariance whitening method is used. Finally, using the estimated RTFs and coherence of the residual reverberation components, a MVDR beamformer of the second stage is then used to reduce the residual reverberations from the output signal of the first stage WPE dereverberation and provide a final enhanced signal. Since the residual reverberation sound field is estimated from the received signals themselves, it accounts for the actual acoustic environment, and can obtain better dereverberation than other conventional methods which adopt the ideal diffuse sound-field for reverberation. The phrase actual acoustic environment herein refers to a real-world acoustic environment that is not merely theoretical.

The combined WPE and MVDR dereverberation using the estimated coherence of reverberant components of the IR improves multiple speech quality criteria compared to the existing methods, e.g., as measured by direct speech to reverberant ratio (SRR), cepstral distance (CD), and/or word error rate (WER). This results in an improvement in the function of any computing device with speech processing that needs a clear speech signal free of reverberations including those with ASR and/or speaker recognition (SR) and voice communications in high reverberations conditions.

Furthermore, since the direct speech to reverberant ratio (SRR) at the output of the WPE is already improved compared to the input, the steering vector of the early speech component can be estimated in the second stage MVDR beamforming by using a covariance whitening (CW) method. By estimating the RTF of the early components, the MVDR aims to maintain a distortionless response towards the RTF, and only then tries to minimize the "noise" component at the output. Wrongly including the reverberant components in the estimated RTF will result in the MVDR maintaining the reverberant components, and will prevent the MVDR from fulfilling its potential to dereverberate the signals. Furthermore, using the covariance matrix of the reverberant components as the whitening matrix for the CW, reduces the contamination of the estimated RTF by the reverberant components. The details are explained below.

Figure 1:
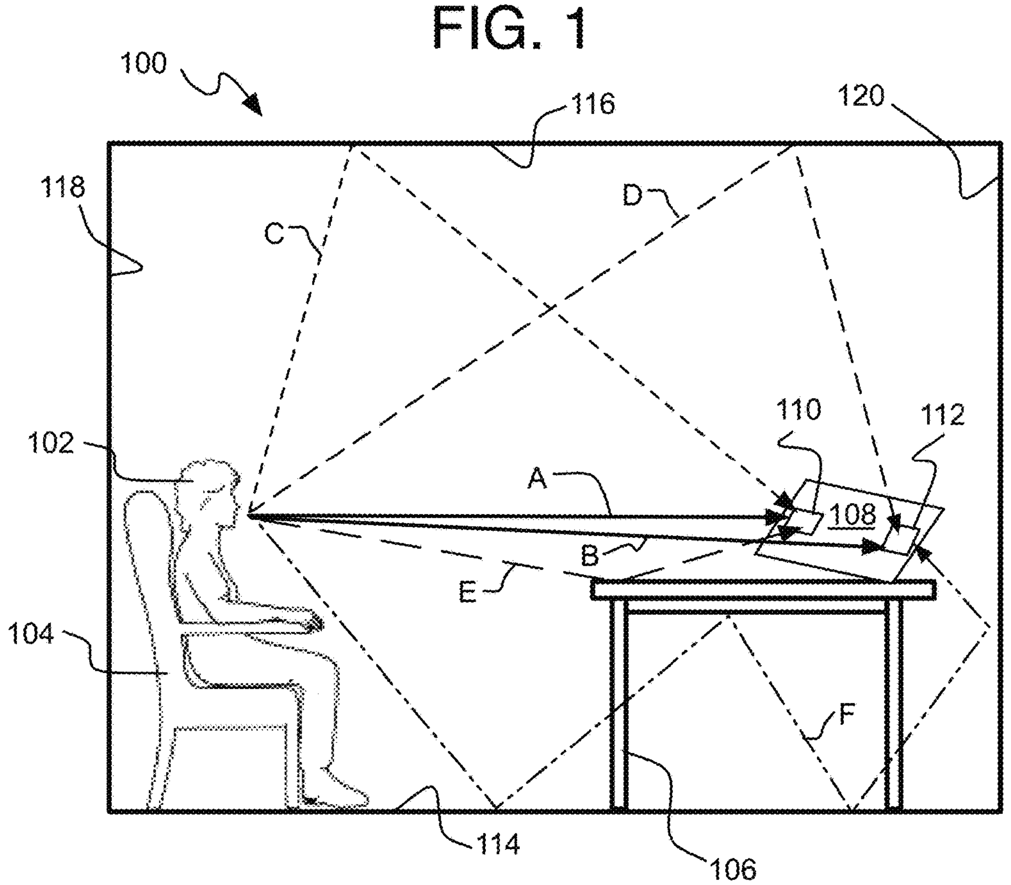
FIG. 1 is a schematic diagram of an example acoustic environment generating reverberations and capturing acoustic signals with microphones for using the implementations described herein.

Referring to FIG. 1 to provide more detail now, an example acoustic environment 100 is shown to assist with explaining the dereverberation system and methods described herein. The acoustic environment 100 is spatially formed of a floor 114, ceiling 116, and walls 118 and 120. The physical objects in the acoustic environment that cause shading are the speech source 102 itself, here a human that is speaking, a chair 104, a table 106, and a tablet 108 that is the audio receiver in this example. All of these physical objects affect the reverberation field of the acoustic environment in this example. It will be understood that the actual acoustic environment is influenced by all the objects and materials in and forming the enclosure, the positions of the speech source and the device, shading of the device itself, and unequal frequency and spatial responses of the microphones. The speech source 102, such as the human speaker as mentioned, is emitting acoustic waves representing human speech. The receiver or receiving device 108 has microphones 110 and 112 to receive the acoustic waves from the source 102 and converts the waves into electrical signals. By one form, direct acoustic waves travel from the source 102 and along direct (or straight) paths A and B to the microphones 110 and 112. These and additional low-order reflections are typically the desired components of the acoustic impulse response, form the desired speech component as described in detail below. Reverberations from the source 102 and ending at the receiver 108 also are formed by reflecting off the surrounding spatial features of the acoustic environment, and as shown may include example reverberations (also referred to as reverberants herein) and include reverberations C, D, E, and F each shown as a different dashed line type. Due to the indirect paths of the reverberations C to F, these reverberations of the audio signal arrive later at microphones 110 and 112 so that the reverberations form the reverberant component and late component of the IR. It should be noted that low-order reverberations (following the direct arrival by the order of tens of milliseconds) are part of the early component of the IR, and tend to increase the speech power, clarity and intelligibility of the speech.

Also, it will be understood that the present method and system will be just as effective in other environments such as during phone conferences when multiple speakers (sources) are in a room with multiple microphones. The number of microphones relative to the number of sources is not limited by the methods used herein, as long as their speech does not overlap. Thus, there may be less microphones than acoustic sources. However, two microphones is a minimum requirement for the second stage MVDR. Furthermore, increasing the number of microphones increases the performance of the dereverberation system. Also, the placement of sources and the microphones is not limited either except that source and microphone(s) should be within some maximum distance from each other, and/or some minimum volume (loudness), only limited by the sensitivity of the microphone.

Referring now to FIG. 2, a speech processing system 200 may have an audio capture or receiving device such as an array of microphones 202, to receive sound waves, and that converts the waves into raw electrical signals that may be recorded in a memory or processed further. The acoustic signals may be generated from sound waves of human speech (such as acoustic signals of about 8 khz for narrowband speech to about 16 khz for wide-band speech by one example). The microphones 202 may transmit a number of acoustic signals recording the same sound during the same time period. The speech processing system 200 may provide the received acoustic signals to an ADC unit 204 to convert the analog signals to digital form, a pre-processing unit to clean, transform and/or format the acoustic signals into audio data or signals that can be used by applications, and this includes a dereverberation unit 208 described in detail herein as well as a unit 210 to handle other pre-processing operations. An ASR/VR unit 212 then may be optionally provided as front-end applications to identify words and/or voices when needed for an end audio application 214. The audio applications can use the pre-processed, and ASR/VR when performed, output audio signals for many different purposes including use by audio-based applications that perform an action depending on the recognized words or voice, or to be encoded for transmission, recording, or for immediate generation of an audio signal broadcast. The details are as follows.

While the audio signal is described herein as including human speech, the present methods will work when the audio signal is other than human-speech and may be formed from other sounds such as non-speech human sounds, animal sounds, other sounds from nature, music, other industrial sounds, and so forth, and is not always limited to human speech.

As mentioned, the system 200 may have an analog/digital (ADC) converter 204 to provide a digital acoustic signal, and samples of the acoustic signal from the ADC 204 may be obtained at a defined sampling rate (typically, but not always: 8 KHz for narrowband, 16 KHz for wide-band, 48 KHz for audio), for example, and may be triggered by analog front-end (AFE) interrupts. The signal samples then may be provided to a pre-processing unit 206 that performs the dereverberation as well as many other pre-processing tasks. This may include filtering to smooth the samples, apply gains, or assign samples to frames for frame by frame analysis of the audio signal, such as 160 or 320 samples for a duration of 20 msec at 8 KHz and 16 KHz sampling rates respectively may be placed in each frame, although it may be any other desired number of samples. Frame-based processing may be triggered by a frame-interrupt which occurs after a certain number of AFE interrupts. The multiple signals of independent microphones also may be mixed at this point to form a single signal although the dereverberation methods described herein occur on the separate microphone signals. Frame-based pre-processing also may include noise reduction and other frame-based speech/audio enhancement and processing. It should be noted that the system and methods described herein are for relatively noise-free environments.

The dereverberation unit 208 in the methods described herein work on the speech signals that are received from an array of microphones. Other than simple equalization, it is recommended not to apply any pre-processing to the signals before the dereverberation algorithm. Specifically, any non-linear processing, such as single channel noise-reduction, will compromise the dereverberation performance, as it violates the assumed signal model. As described in greater detail below, the dereverberation may include a WPE dereverberation that forms an initial output signal with residual reverberations, and a MVDR beamformer dereverberation that reduces the residual reverberations. The components of the dereverberation unit 208 that perform these operations are described in greater detail below.

As mentioned, the enhanced signals from the pre-processing including audio output signals that contain less reverberations and that can then be provided to specific applications. The term enhanced here includes a significant reduction of reverberations so that good quality audio output signals or data is useable for the applications such as ASR, SR, and other audio applications, and does not necessarily refer to completely eliminating all reverberations from an audio signal.

The enhanced output signals then may be provided to other applications such as the ASR/VR unit 212. The ASR may use the outputs of the dereverberation unit 208 to divide the audio signals into frames, if not performed already, perform feature extraction, acoustic scoring, decoding (transducing), and then language interpretation to provide final recognition of the words in the speech.

The speaker recognition may alternatively, or additionally, include feature extraction, and then text dependent or independent processes that match the extracted features of the output signal to pre-stored voice print data of known sources. Techniques to match the patterns of the output signals and the pre-stored voice prints include frequency estimation, hidden Markov models, Gaussian mixture models, pattern matching algorithms, neural networks, matrix representation, vector quantization, decision trees, "anti-speaker" techniques, such as cohort models, and world models. Spectral features are predominantly used in representing speaker characteristics in many of these techniques. The result is an authentication or identification determination of the source speaker.

The output of the ASR/VR unit 212 when performing ASR may be provided to a telephone unit 216 to perform tasks such as place a call when the speech includes the word "call", for small vocabulary telephone systems. A dictation unit 218 may be provided to write and display the words spoken in the speech. A non-speech reaction applications unit 220 includes any other applications that perform a task in response to understood words in the speech. This may include starting an automobile for example, or unlocking a lock, whether a physical or virtual lock such as a software protected smartphone or other computing device. The reaction also may be the performance of a search on a web browsing search web site when the speech is spoken to an intelligent personal assistance on a computing device for example. When VR is being used, the authentication approval or disapproval, or speaker identification, may be provided to a security application 224 for permitting access, or not permitting such access, to something that is locked, again whether the item that is locked is in physical form such as a door lock, or virtual in software form such as access to a memory. Otherwise, the signals may be provided to the speaker unit 222 that may be any device that can emit sound for the signals being processed, and whether or not the ASR/VR unit 212 is used. Thus, speaker unit 222 may be considered part of, or emits sound for, the telephone unit 216.

Referring to FIG. 3, an audio processing device 300, such as audio processing device 200, has a dereverberation unit 310 that may or may not be considered part of a pre-processing unit. Microphones 302 and 304 receive acoustic waves including direct and reverberation components, and convert those waves into audio signals as described above. The signals from each microphone are denoted as $x_1$ to $x_M$, where M is the number of microphones providing an audio signal. A WPE dereverberation filtering unit (or just WPE unit or WPE) 306 is then used to filter out the reverberations for each signal $x_1$ to $x_M$, and particularly the reverberant component of the IRs. As mentioned, this includes correlation of reverberant components on a current frame to the audio signal of previous time frames and by using LPC as mentioned above. This results in a dereverberated WPE initial output $y_1$ to $y_M$. These initial outputs or output signals $y_1$ to $y_M$ still have residual reverberations. Thus, the outputs $y_1$ to $y_M$ are provided to a MVDR beamformer unit 308 to reduce or eliminate the remaining residual reverberations. The WPE unit 306 also may provide the MVDR beamformer unit 308 with an estimate of the multichannel coherence $\hat{\Phi}_{rr}(f)$, per frequency, of the reverberant components. The estimated coherence is then used by the MVDR beamformer unit in: a) estimating the early components RTF; b) designing the dereverberation beamformer, i.e., determining the set of coefficients, per frequency, that are used to combine the outputs of the WPE stage, signals $y_1$ to $y_M$, to further reduce the residual reverberation in the signals and provide a final enhanced output signal $\hat{d}$. A more detailed description of the dereverberation unit is as follows.

Figure 4:
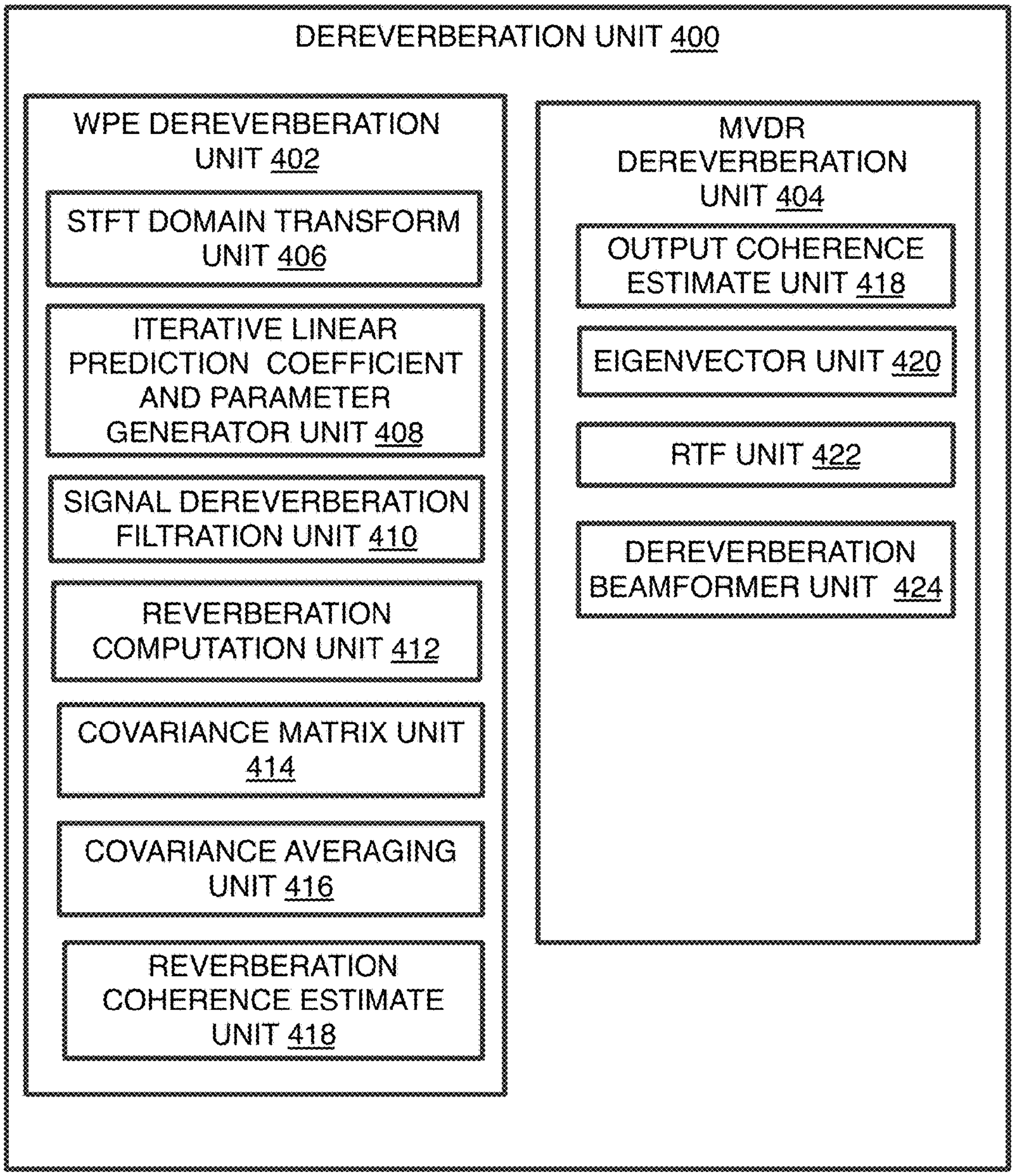
FIG. 4 is a flow chart of a method of dereverberation factoring the actual acoustic environment.

Referring to FIG. 4, a dereverberation unit 400 may be used to perform dereverberation processes 500 and 600 described below. The dereverberation unit 400 may have a weighted prediction error (WPE) dereverberation unit (WPE unit or WPE) 402 and a MVDR dereverberation unit 404, similar to that of dereverberation unit 208 (FIG. 2) or 310 (FIG. 3). Here, the WPE unit 402 has a STFT domain transform unit 406 that transforms the received time-domain audio signals into frequency domain signals or data, using short-term windows to perform the transform by known methods. It will be understood that the STFT domain transform unit alternatively may be considered part of one or more other modules in or out of the dereverberation unit 400 and that perform tasks other than dereverberation (whether for ASR, VR, or some other audio related task) so that the STFT domain signals may be used for multiple tasks including dereverberation. The WPE unit 402 also has an iterative linear prediction coefficient (LPC) and parameter generator unit 408 to form the prediction coefficients and parameters to be used to perform the filtering of the reverberations and are determined by finding correlations between the reverberant components of the IRs that also appear earlier in the IRs. A signal dereverberation filtration unit 410 performs the actual filtering by applying the coefficients to the inputs to compute cleaner output signals $y_1$ to $y_M$ that have reduced or eliminated reverberant components but that still have residual reverberations mostly formed of late components of the IRs. A reverberation computation unit 412 then computes the reverberations to be used for the coherence estimation. A reverberation covariance matrix unit 414 uses the reverberations to form covariance matrices. A covariance averaging unit 416 may apply an IIR filter function to factor a previous covariance matrix for the current covariance matrix while applying a smoothing factor. The resulting matrix is averaged over time by a coherence estimate unit 418 and for the single frequency to complete the long-term covariance averaging. This is repeated for each frequency bin in a frequency domain. The WPE outputs $y_1$ to $y_M$ of each or individual microphones, and the estimated coherences for each or individual frequency of each WPE output, is then provided to the MVDR dereverberation unit 404.

The example MVDR dereverberation unit 404 receives the $y_1$ to $y_M$ outputs of the WPE and uses an output coherence estimate unit 418 to determine the multichannel coherence of the residual reverberations. This matrix is used to whiten the multichannel coherence matrix of the speech segments at the output of the WPE (comprising early and residual reverberation components) in the estimates of the early component RTF (unit 422) using an Eigenvector unit 420. The generated RTFs for different frequencies are then used by a MVDR beamformer unit 424 that computes a dereverberation beamformer that is applied to the WPE output to cancel the residual reverberation. The outputs of the WPE are linearly combined, per frequency, to coherently sum the early components at the multiple outputs while minimizing the power of the residual reverberations component at the output. More details are provided below.

Figure 5:
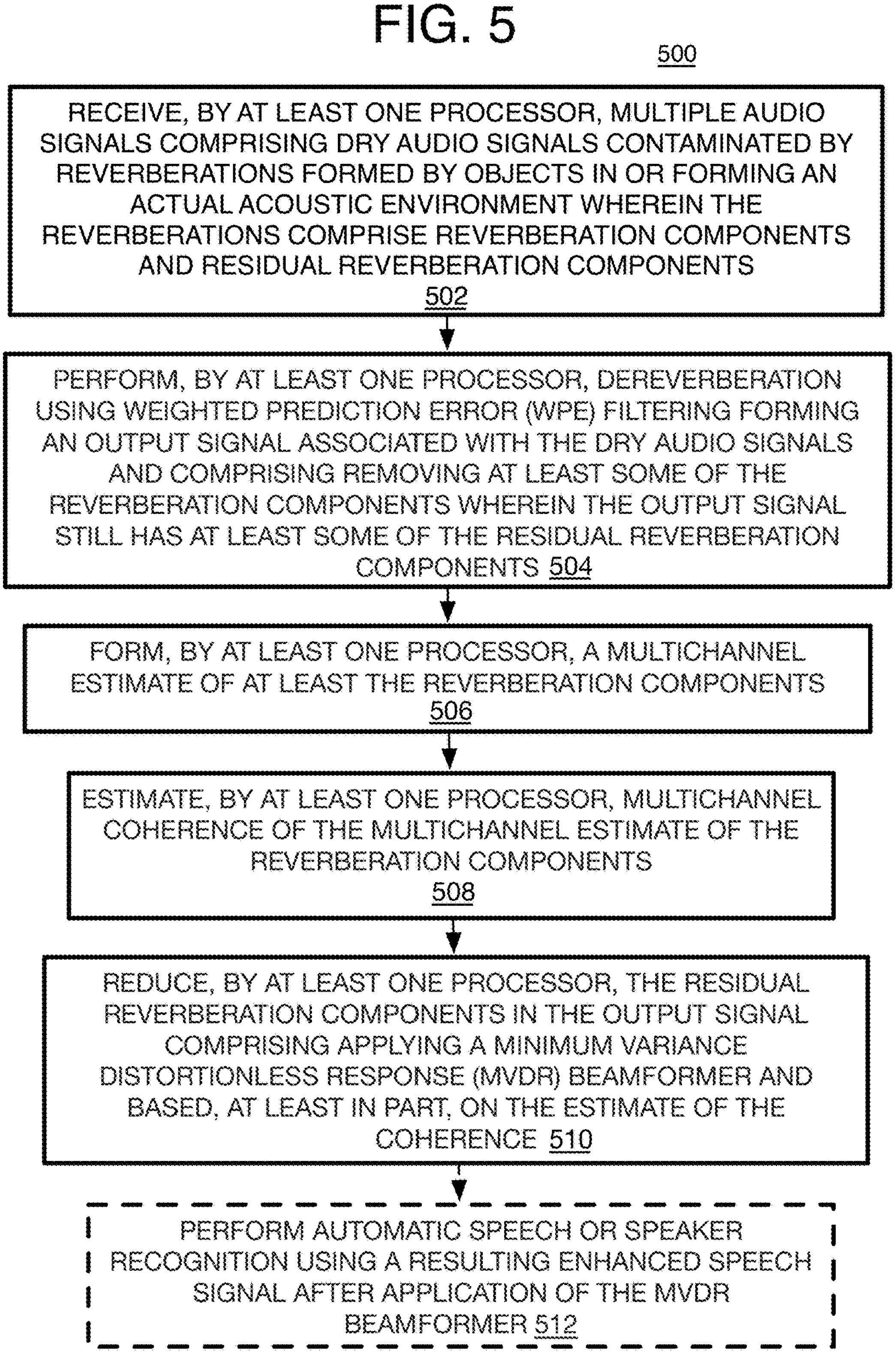
FIG. 5 is a schematic diagram of a dereverberation unit for an audio processing system according to the implementations herein.

Referring to FIG. 5, an example process 500 for a computer-implemented method of acoustic dereverberation factoring the actual acoustic environment is provided. In the illustrated implementation, process 500 may include one or more operations, functions or actions as illustrated by one or more of operations 502 to 510 numbered evenly. By way of non-limiting example, process 500 may be described herein with reference to example acoustic signal processing devices described herein with any of FIGS. 1-4 and 12, and where relevant.

Process 500 may include "receive, by at least one processor, multiple audio signals comprising dry audio signals contaminated by reverberations formed by objects in or forming an actual acoustic environment wherein the reverberations comprise reverberation components and residual reverberation components" 502. In other words, this operation is directed to receiving audio signals from multiple microphones and that include reverberations with arbitrary spatial properties caused by physical objects that form the actual acoustic environment or cause shading within the actual acoustic environment where the acoustic waves or signals originated from a source. The acoustic environment may be formed of other objects such as those relating to the microphones or pattern of the reverberation as well and as described elsewhere herein. The actual acoustic environment also refers to the real or actual acoustic environment where an audio capturing device is operating in various conditions rather than fixed experimental conditions such as for calibration by the manufacturer for instance or a purely theoretical acoustic environment. The initial reverberation refers to the reverberant components of the impulse responses for example.

Process 500 also may include "perform, by at least one processor, dereverberation using weighted prediction error (WPE) filtering forming an output signal associated with the dry audio signals and comprising removing at least some of the reverberation components wherein the output signal still has at least some of the residual reverberation components" 504. As described in detail herein, a WPE filtering process may be performed that correlates reverberant signal patterns with earlier patterns, and when a match is found, coefficients are determined to cancel that reverberant pattern. The result is removal of much of the reverberation (or reverberant or middle) component of the IR but where the late component (or residual reverberation component) may remain in the WPE output signals. The details are provided below.

Process 500 may include "form, by at least one processor, a multichannel estimate of at least the reverberation components" 506. Particularly, this operation includes forming the reverberation estimate values by using the prediction coefficients of the WPE filtering. The result is the reverberations in the STFT domain (herein called $\hat{r}(n, f)$ by one example), where a row is provided for each microphone that is used, and each column provides reverberation values that fit in a single frequency bin of the frequency domain of the audio signal as described below. These signals may be provided for each time-frame.

Process 500 also may include "estimate, by at least one processor, multichannel coherence of the multichannel estimate of the reverberation components" 508. As explained in detail below, this is accomplished by first forming a covariance matrix for each frequency bin, and for each time frame n. The covariance matrices of the same frequency bin have its covariance values adjusted in an infinite impulse response (IIR) filtering function by using a smoothing value and the previous covariance matrix. The application of the smoothing value and the multiplication of the noisy reverberant vectors effectively provides an average covariance as described in detail below (see equation (23)). This is provided for each frequency bin.

Process 500 also may comprise "reducing, by at least one processor, the residual reverberation components in the output signal comprising applying a minimum variance distortionless response (MVDR) beamformer and based, at least in part, on the estimate of the coherence" 510, and particularly, the coherence estimates are placed in a relative transform function using covariance whitening to generate a frequency domain matrix of residual reverberation coefficients. This resulting matrix $w_r(f)$ of coefficients it then applied to the outputs from the WPE, where the reverberant component was already removed by the WPE, to generate an enhanced output signal with reduced residual reverberations. More particularly, $w_r(f)$ is a vector of coefficients per frequency bin. This operation also is described in detail below.

Optionally, process 500 also may comprise "perform automatic speech recognition or speaker recognition using a resulting enhanced speech signal after application of the MVDR beamformer" 512. Thus, the present process is part of fundamental operations of a computer or computing device, and is an improvement of such functions of the computer. Other functions of the computer may be improved as well including emission of the audio of the signal, and others described herein.

Figure 6:
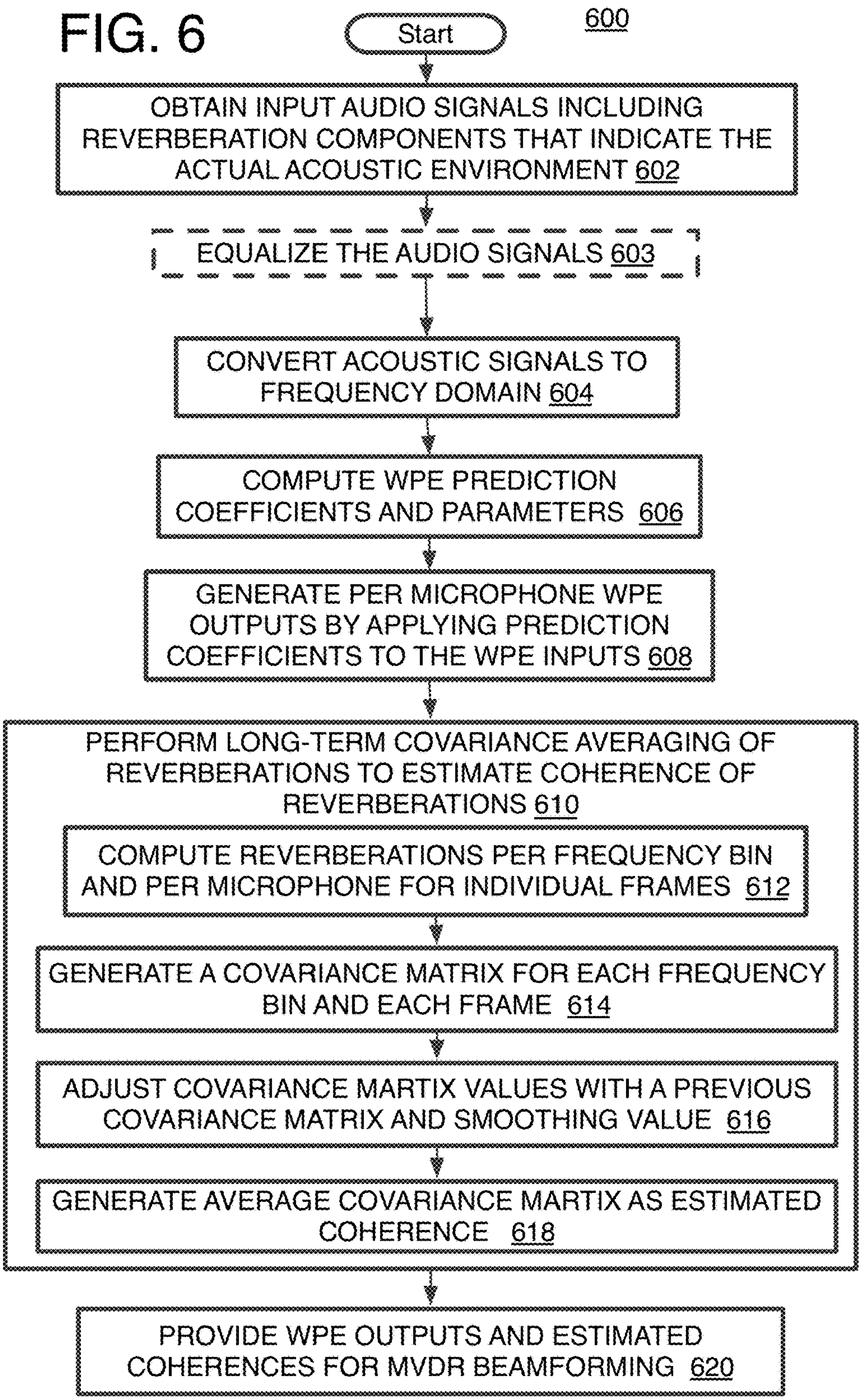
FIG. 6 is a detailed flow chart of a method of dereverberation factoring the actual acoustic environment.

Referring to FIG. 6, an example process 600 for a computer-implemented method of acoustic dereverberation factoring the actual acoustic environment is provided, and particularly including WPE filtering. In the illustrated implementation, process 600 may include one or more operations, functions or actions as illustrated by one or more of operations 602 to 620 generally numbered evenly. By way of non-limiting example, process 600 may be described with reference to example acoustic signal processing devices described herein with any of FIGS. 1-4 and 12, and where relevant.

Process 600 may include "obtain input audio signals including reverberation components that indicate the actual acoustic environment" 602. Thus, as mentioned above, the actual acoustic environment mainly refers to the use of an audio capture device by an end user in various real world conditions instead of experimental conditions with controlled environmental parameters. Thus, the actual acoustic environment does not typically include calibration environments that are at the manufacturers' facilities for example, but could include calibration operations performed after sale of the device where the acoustic environment is not substantially controlled.

Also as described above, the acoustic environment also refers to physical objects that form the acoustic environment such as the walls and ground (which could be the only hard flat surface forming the environment) or floor, but generally includes anything that can cause a reflection of an acoustic wave. Likewise, any objects in the acoustic environment that cause shading by blocking an acoustic wave pathway maybe considered part of the acoustic environment including furniture, the source (person) him/herself, the microphone or audio capture device, and so forth. The physical location of the microphone relative to the source as well as the distance between microphones when multiple microphones are provided, also are considered part of the acoustic environment. Other objects that are not necessarily considered physical (as far as human touch) also may be considered part of the acoustic environment such as variation in the frequency response in the one or more microphones being used, and a non-uniform reverberation pattern itself. Note that the materials from which objects in the environment are made of, can also affect the acoustic environment as different materials reflect acoustic waves differently.

Also as mentioned above with impulse response 10 (FIG. 1A), the impulse response comprises an early component which is the desired component of the IR, as it corresponds to the desired component of the speech received by the microphones. Thereafter, IR has a reverberant component, and finally the late or residual component. The conventional de-correlation dereverberation systems attempt to reduce the reverberant component, but typically the late or residual component that is inevitable in any de-correlation based dereverberation system remains. The method and system disclosed herein further reduces this component. The length of the impulse response (IR), in the order of hundreds of milliseconds, is in general much higher than the quasi-stationary time of the dry speech signal, which is in the order of a few tens of milliseconds. The received signals at the microphone has the multichannel output of a set of linear filters, determined by the IRs, corresponding to the dry speech signal at the input.

By one form, when multiple microphones are being used as in the examples provided below, each microphone provides a different signal which corresponds to its individual IR and its components (early, reverberant, and residual reverberations).

Optionally, process 600 may include "equalize the audio signals" 603 where conventional equalization may be provided to initially compensate for a non-flat frequency response at the microphones. As mentioned above, other pre-processing should be avoided.

Process 600 may include "convert acoustic signals to frequency domain" 604, and specifically from the time domain using a short-time Fourier transform. This provides the input audio signal frequency values divided into frequency bins rather than by time. The STFT window length should correspond to the length of the early component of the IR. Hence, typical window lengths are in the order of tens of milliseconds. Typical overlap between frames is 50-75%.

As mentioned above, the dereverberation here is performed by using a combination of two algorithms which stem from different approaches to speech dereverberation, namely, the WPE and the MVDR beamformer. Preliminarily, the following formulation will assist in the understanding of the disclosed dereverberation processes.

Let $\underline{s}(t)$ denote a speech signal uttered by the desired speaker, where the underline of $\underline{s}$ denotes terms in the time domain and t denotes the discrete time index with a sampling rate of $f_s$. The speech signal propagates in a reverberant enclosure and impinges on an array comprising of M microphones. The M-dimensional vector of received microphone signals is:

$$\underline{x}(t)=\Sigma_{k=0}^{\infty}\underline{h}_k\cdot\underline{s}(t-k)+\underline{v}(t) \quad (1)$$

where x(t) is the input signal of multiple microphones, $\underline{h}_k=[h_{k,1} \ldots h_{k,M}]^T$ denotes a vector comprising the k-th tap coefficients of the multichannel acoustic impulse responses (IRs) as mentioned above, and $\underline{v}(t)$ denotes additive sensor noise from multiple sensors with variance $\sigma_v^2$, statistically independent of the speech source.

Due to the relatively long duration of an IR and the spectral structure of the speech signal, a common practice is to process the microphone signals in the short-time Fourier Transform (STFT) domain. In this case, F is denoted as the length of analysis and synthesis windows, and D denotes the overlap between consecutive frames. For practical reasons, it is assumed that F is short compared to the length of the IR. A signal model is adopted that is provided by R. Talmon, I. Cohen and S. Gannot, "Relative transfer function identification using convolutive transfer function approximation," IEEE Trans. Audio, Speech and Language Processing, vol. 17, no. 4, pp. 546-555, 2009. Therefore, the problem is formulated in the STFT domain as a convolution along the timeframe axis per frequency bin, while neglecting the cross-band filters. The accuracy of this approximation, as well as the more general model is given in Y. Avargel and I. Cohen, "System identification in the short-time Fourier transform domain with crossband filtering," IEEE Trans. Audio, Speech and Language Processing, vol. 15, no. 4, pp. 1305-1319, 2007. Hence, the received microphone signals are formulated in the STFT domain as:

$$x(n,f)=d(n,f)+r(n,f)+v(n,f) \quad (2)$$

where x(n, f) is a vector of input signals of all microphones in the STFT domain, n and f denote the time (or frame) and frequency-bin indices, respectively, v(n, f) indicates the sensor noise in the STFT domain, and the notations d(n, f) and r(n, f) correspond to the early and reverberant components of the received speech in the frequency domain, where:

$$d(n,f)=h_0(f)\cdot s(n,f) \quad (3)$$

$$r(n,f)=\Sigma_{\tau=1}^{\infty}h_\tau\cdot s(n-\tau,f) \quad (4)$$

where $h_\tau(f)$ for $\tau$=0, 1, . . . , ∞ and is the Convolutive Transfer Function (CTF). The zero-th tap of the CTF, i.e. $h_0(f)$, is the early component of the IR transformed to the frequency domain. The rest of the CTF, i.e., $h_\tau(f)$ for $\tau$=1, 2 . . . . , ∞ comprises all other high-order reflections of the IRs, also denoted as the reverberation components, transformed to the STFT domain. Also, signal s(n, f) corresponds to the latest dry speech component that contributes to the received signals at the current (n-th) time frame, and s(n−τ, f) correspond to older frames of the speech components which due to the reverberations contributed to the current frame (n-th). It is assumed that the early and reverberant components, i.e., d(n, f) and r(n, f), are statistically independent (to satisfy this assumption, the STFT window length shouldn't be selected too small). Also, apart from some low-level noise from the sensors, a quiet environment is assumed. Other techniques may be applied simultaneously to the dereverberation methods described herein to reduce noise and are not described.

The system and methods disclosed herein perform dereverberating the received speech and retrieving the early speech component d(n, f) in a way that factors the actual or real-world, spatial acoustic environment in which the speech was captured on a device with multiple microphones. The disclosed system and methods are better at providing an enhanced speech and eliminating or reducing reverberations thanks to better modelling of the residual reverberations of de-correlation based dereverberation systems. This modelling corresponds to the actual acoustic environment and includes microphone position errors, non-ideal and non-equal microphone frequency-responses, acoustic shading of certain directions by the device itself or by other objects, and a non-uniform reverberation field.

As mentioned, the present methods include the combination of the WPE algorithm and MVDR techniques. The WPE algorithm treats the reverberation process as a convolutive filter in the STFT domain, and aims at de-correlating the current frame from past frames via linear filtering. The MVDR treats the reverberant component as an interference, and tries to attenuate the reverberations spatially, by using a superdirective beamformer. Some basics of WPE and MVDR are explained below, and then the disclosed system and method are explained.

Weighted Prediction Error

Continuing with process 600, the next operation of process 600 may include "compute WPE prediction coefficients and parameters" 606. The WPE algorithm considers the problem of dereverberating the speech component at a first microphone by using all M microphones. The basic idea is to reduce reverberation by de-correlating past time-frames from the current time-frame and utilizing a time-varying linear prediction coefficients (LPC) model for the early speech component at the first microphone, and this can be performed in the STFT domain. See for example, T. Nakatani, T. Yoshioka, K. Kinoshita, M. Miyoshi, and B.-H. Juang, "Blind speech dereverberation with multi-channel linear prediction based on short time Fourier transform representation," in 2008 IEEE International Conference on Acoustics, Speech and Signal Processing. IEEE, 2008, pp. 85-88. The LPC parameters corresponding to the nth-time-frame can be determined by:

$$\theta(n) \triangleq \{\sigma^2(n), a(n)\} \tag{5}$$

where θ(n) is the set of LPC parameters corresponding to the n-th frame of the early speech component arranged in a vector. These include $\sigma^2(n)$ as the variance of the input signal to the auto regressive (AR) filter, and a(n) as the vector of coefficients of the AR filter. The early speech component is modeled in the STFT domain as a complex Gaussian random variable with zero mean, and variance of:

$$\sigma_s^2(n, f) \triangleq \frac{\sigma^2(n)}{|DFT\{a(n)\}|^2} \tag{6}$$

where DFT{ } indicates the Discrete Fourier Transform (DFT). The enhanced signal, estimating the early speech component at the first microphone, is obtained through the following linear filtering process:

$$y_1(n,f) = x_1(n,f) - \hat{r}_1(n,f) \tag{7}$$

where $y_1(n, f)$ is the resulting WPE signal output of the remaining early or desired speech after removal or reduction of reverberations, $x_1(n,f)$ is the signal input at the first microphone, and $\hat{r}_1(n, f)$ is the estimated reverberant component at the first microphone, and may be computed by:

$$\hat{r}_1(n,f) = \Sigma_{\tau=n_s}^{n_e} p_{1,\tau}(f)^H x(n-\tau,f) \tag{8}$$

where $\{p_{1,\tau}(f)\}_{\tau=n_s}^{n_e}$ are the linear prediction filters which process multichannel microphone signals of past frames in the range of $[n-n_e, n-n_s]$ for enhancing the n-th frame of the first microphone, H is the Hermitian operator. The first microphone signal is modelled in the STFT domain as a complex Gaussian random variable given past multichannel microphone frames, the speech model parameters, and the linear prediction filters. The set of linear prediction filters of the first microphone for the f-th frequency bin are indicated as $\{\ \}_{\tau=n_s}$:

$$P_1(f) \triangleq [p_{1,n_s}(f), \ldots p_{1,n_e}(f)] \tag{9}$$

The set of all prediction filters of the first microphone over all frequencies is given by:

$$\mathcal{F}_1 \triangleq \{P_1(0), P_1(1), \ldots, P_1(F-1)\} \tag{10}$$

where F and n are as defined above, and the set of LPC parameters by:

$$\Theta \triangleq \{\theta(0), \ldots, \theta(N-1)\} \tag{11}$$

The log-likelihood of the first microphone signal given $\mathcal{F}_1$ and Θ is shown to equal:

$$\mathcal{L}(\Theta, \mathcal{P}_1) = \sum_{f=0}^{F-1}\sum_{n=0}^{N-1} \log\sigma_s^2(n, f) + \frac{\left| x_1(n, f) - \sum_{\tau=n_s}^{n_e} p_{1,\tau}(f)^H x(n-\tau, f)\right|^2}{\sigma_s^2(n, f)} \tag{12}$$

An iterative algorithm is used which alternates between optimizing Θ and $\mathcal{F}_1$ for maximizing the log-likelihood. The step for optimizing Θ comprises a Yule-Walker solution (linear system solver), and the step for optimizing $\mathcal{F}_1$ can be interpreted as an extension to the Yule-Walker solution. Only a few iterations are required to provide adequate dereverberation performance. The basic WPE can be extended to the MIMO case (by estimating $\mathcal{F}_m$ for the m-th microphone) and can also be implemented using sub-bands as disclosed by T. Yoshioka and T. Nakatani, "Generalization of multi-channel linear prediction methods for blind MIMO impulse response shortening," IEEE Trans. Audio, Speech and Language Processing, vol. 20, no. 10, pp. 2707-2720, 2012. The result of the MIMO WPE filtering is an output vector of signals y(n, f) (M dimensional vector).

Figure 7:
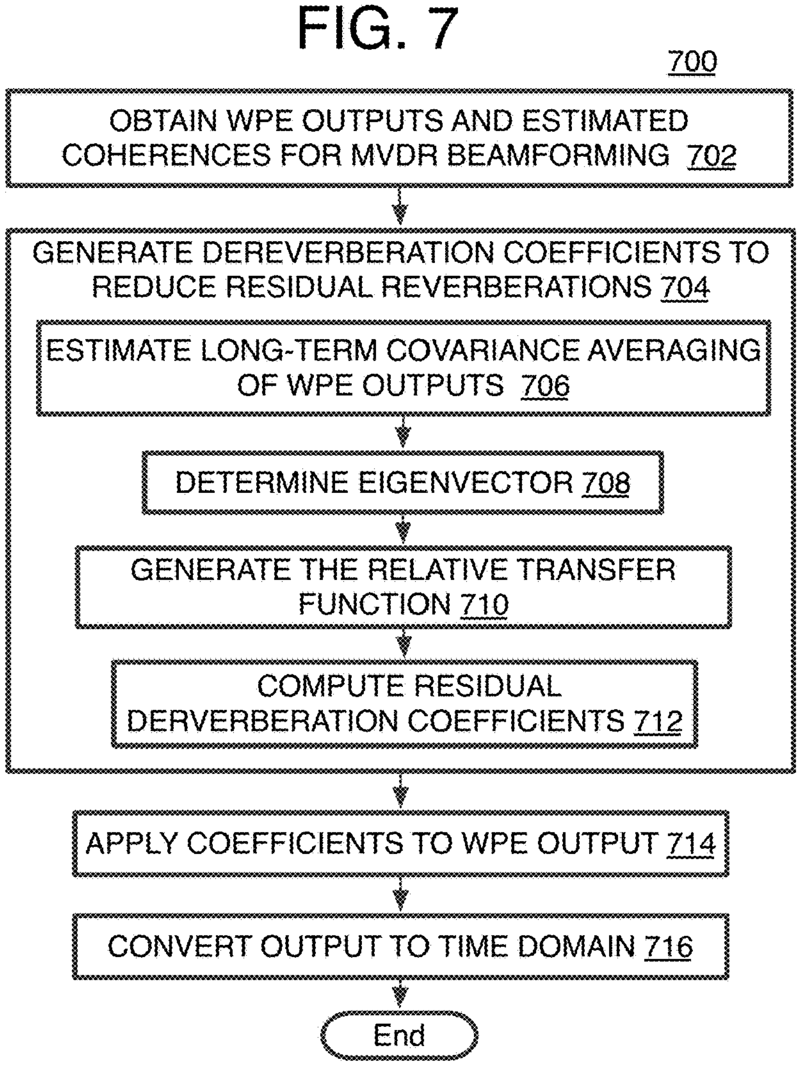
FIG. 7 is another detailed flow chart of a method of dereverberation factoring the actual acoustic environment.

Thus, as mentioned, the WPE treats the reverberation process as a convolutive filter in the STFT domain, and aims at de-correlating the current frame from past frames via linear filtering. The MVDR treats the reverberant component as an interference, and tries to attenuate it spatially, by using a superdirective beamformer. The two-stage algorithm disclosed here combines the two approaches for dereverberation. The first-stage, covered by process 600, applies the WPE algorithm for constructing dryer microphone signals, i.e., use the multichannel inputs to dereverberate each of the microphone signals. A significant level of dereverberation is attained by this stage, however, due to practical considerations, model mismatch, and estimation errors, a residual reverberant component at the output of this stage (including late reverberations) is inevitable. This is reduced by the MVDR beamformer second-stage covered by process 700 (FIG. 7).

Process 600 then may include "generate per microphone WPE outputs by applying prediction coefficients to the WPE inputs" 608. Thus, the output signals of the first-stage WPE algorithm are computed as described just above and are given by:

$$y(n,f) = d(n,f) + c(n,f) + u(n,f) \tag{13}$$

where n is the time (or frame) count (or time index), f is the frequency bin or index, y(n, f) is the WPE output vector of signals (M dimensional vector), c(n, f) and u(n, f) are the residual reverberant component and noise respectively at the output of the WPE, respectively, and d(n, f) is the early (or dry) speech component (or other audio) component that is desired. Each is a matrix, and since the values are in the frequency domain at this point, each matrix has a different row for each microphone providing an audio signal, and each column is a different frequency bin of the domain. The values at the (i, j) locations in the matrices are exact frequency values within a particular frequency bin. The residual reverberant component is defined as follows:

$$c(n,f) \triangleq r(n,f) - \Sigma_{\tau=n_s}^{n_e} P_\tau^H(f)(d(n-\tau,f) + r(n-\tau,f)) \tag{14}$$

where τ is a time counter covering the duration de-correlation filters, d(n, f) is the early speech components vector of all microphones, r(n,f) is the reverberant speech components vector of all microphones, and $P_\tau \triangleq [p_{1,\tau}(f), \ldots, p_{M,\tau}(f)]$ is a M×M matrix for $\tau=n_s, \ldots, n_e$ comprising the de-correlation coefficient (estimated by WPE) for de-reverberating the vector of microphones.

Relevant here, the process 600 may include "perform long-term covariance averaging of reverberations to estimate coherence of reverberations" 610. This may include the operation "compute reverberations per frequency bin and per microphone for individual frames" 612. Thus, the estimated noisy reverberant vector may be computed as follows (using equation (8) from above):

$$\hat{r}(n,f)=\Sigma_{\tau=n_s}^{n_s} P_\tau^H(f)^H x(n-\tau,f) \quad (15)$$

Minimum Variance Distortionless Response

Next to understand the operations to be performed by the WPE filtering unit, or any other unit, to provide a coherence estimate to the MVDR beamformer unit, MVDR should be explained first. Regarding the MVDR beamformer now, an alternative approach for dereverberation, which is based on the MVDR criterion, is proposed in O. Schwartz, et al., "Multimicrophone speech dereverberation and noise reduction using relative early transfer functions," IEEE/ACM Transactions on Audio, Speech, and Language Processing, vol. 23, no. 2, pp. 240-251, 2015. Here, the reverberant component is treated as a diffuse noise field (see M. R. Schroeder, "Frequency-correlation functions of frequency responses in rooms," Journal of the Acoustical Society of America, vol. 34, no. 12, pp. 1819-1823, 1962), and a beamformer is designed which minimizes the interference while maintaining a distortionless response towards the early speech component at a reference microphone. In this case, the Relative Transfer Function (RTF) of the early speech component may be defined as:

$$g_0(f) \triangleq \frac{h_0(f)}{h_{0,1}(f)} \quad (16)$$

where $h_{0,1}(f)$ is the Transfer Function (TF) between the speech source and early speech component at the first microphone. Something similar is disclosed by S. Gannot, et al., "Signal enhancement using beamforming and nonstationarity with applications to speech," IEEE Transactions on Signal Processing, vol. 49, no. 8, pp. 1614-1626, 2001.

The conventional dereverberation MVDR beamformer is then obtained by:

$$w(f) = \frac{\Phi^{-1}(n,f)g_0(f)}{g_o^H \Phi^{-1}(n,f)g_0(f)} \quad (17)$$

where the covariance matrix of the total interference is:

$$\Phi(n,f)=\sigma_r^2\Gamma(f)+\Phi_{vv}(f) \quad (18)$$

and comprises both reverberant speech and noise. Specifically, the term $\sigma_r^2\Gamma(f)$ is the spectrum of the reverberant component, the matrix $\Phi_{vv}(f)$ is the noise covariance matrix, and Γ(f) is the spatial coherence matrix of an ideal diffuse noise field. See, N. Dal Degan and C. Prati, "Acoustic noise analysis and speech enhancement techniques for mobile radio applications," Signal Processing, vol. 15, no. 1, pp. 43-56, 1988, and E. A. Habets and S. Gannot, "Generating sensor signals in isotropic noise fields," The Journal of the Acoustical Society of America, vol. 122, no. 6, pp. 3464-3470, 2007. The theoretical coherence between the components received at the m-th and m'-th microphones for an ideal diffuse noise field is:

$$\gamma_{mm'}(f) \triangleq \mathrm{sinc}\left(\frac{2\pi f \delta_{mm'}}{v}\right) \quad (19)$$

where:

$$\mathrm{sinc}(\alpha) \triangleq \frac{\sin\alpha}{\alpha} \quad (20)$$

and where $\delta_{mm'}$ is the distance between microphones m and m', and v here is the sound velocity and f is the frequency. For example, Schwartz (citation above) uses equation (18) and multiplies the result by estimated reverberation levels (in contrast to actual values) by averaging the power spectral density (PSD) estimated across all channels. Thus, this theoretical coherence does not factor actual acoustic environment and is based on computations made by using a theoretical environment. Thus, the measured coherence can vary widely due to non-ideal conditions when the actual spatial properties are taken into account and other estimation or modeling errors may take place.

By one conventional example in Schwartz (not used here), given a rough estimate of the exponential decay of the reverberant component (related to the Reverberation Time (RT) of the room), the spectrum of the reverberant component may be estimated using spectral subtraction similarly to the single channel dereverberation method as in E. A. P. Habets, et al., "Joint dereverberation and residual echo suppression of speech signals in noisy environments," IEEE Trans. Audio, Speech and Language Processing, vol. 16, no. 8, pp. 1433-1451, 2008. The output signals of the latter single-channel dereverberation procedure, applied to each of the microphones, are also used for estimating the RTF of the early speech component.

For constructing the MVDR beamformer at the second stage, the system uses estimates of the RTF of the early speech component $g_0(f)$ and of the covariance matrix of the interference at the output of the first stage, i.e. $\Phi_{cc}(f)+\Phi_{uu}(f)$ where $\Phi_{cc}(f)$ and $\Phi_{uu}(f)$ are the covariance matrices of the components c(n, f) and u(n, f), respectively. Although, the reverberant component c(n, f) is non-stationary, it is proposed to use a time-invariant model for its covariance using long-term averaging.

A common model for the spatial properties of the reverberant component is the diffuse noise field since it comprises of a large number of statistically-independent speech reflections (due to large delays) arriving from all directions. Here, a similar argument is made for the residual reverberant speech at the output of the WPE, i.e., c(n, f). Assuming that c(n, f) has the speech source filtered by the late reverberant component of the IR, it is conjectured that the residual component also should follow the diffuse noise field model. The various components of the IR are depicted in FIG. 1A above. Furthermore, although theoretically the coherence of diffuse noise between a pair of microphones can be expressed by Eq. (18) above, in practice due to estimation errors and model miss-match, the actual coherence may be different (e.g., due to microphone position errors, non-ideal and non-equal microphone frequency-responses, acoustic shading of certain directions by the device itself or by other objects and a non-uniform reverberation field). These errors, which might compromise the dereverberation performance, are avoided by utilizing the coherence of the reverberant component at the received microphones, as estimated by the WPE, i.e., $\hat{r}(n, f)$.

Accordingly, process 600 then may include "generate a covariance matrix for each frequency bin and each frame" 614. Explicitly, assuming high signal-to-noise ratio (SNR), it is approximated that:

$$\Phi_{rr}(n,f)+\Phi_{uu}(n,f)\approx\Phi_{rr}(n,f) \tag{21}$$

where $\hat{\Phi}_{rr}(n, f)$ is estimated coherence and is estimated using long-term covariance averaging of the signal $\hat{r}(n, f)$, which is generated by the WPE in the first stage. Specifically, matrix $\hat{r}(n, f)$ has a row of reverberation values for each microphone, and a column for each frequency bin. Then, an instantaneous covariance matrix is generated for each frequency bin by using:

$$\hat{r}(n,f)\hat{r}^H(n,f) \tag{22}$$

Specifically, process 600 then may include "adjust covariance matrix values with a previous covariance matrix and smoothing value" 616, and "generate average covariance matrix as estimated coherence" 618. The covariance matrix for each frequency bin is averaged as follows using an IIR related filter approach:

$$\Phi_{rr}(n,f)=\alpha\hat{\Phi}_{rr}(n,f)+(1-\alpha)\hat{r}(n,f)\hat{r}^H(n,f) \tag{23}$$

where $\alpha$ is a smoothing parameter that sets a forgetting factor of a previous matrix and where $\alpha$ is determined by experimentation, and is $0<\alpha<1$. By choosing a value for $\alpha$ that is close to 1, a long-term averaging is obtained for the covariance matrix of the reverberation components, per frequency bin.

Process 600 then may include "provide WPE outputs and estimated coherences (in the form of covariances) for MVDR beamforming" 620, where the WPE signal outputs y(n,f) and the estimated multichannel coherence (or covariance) $\hat{\Phi}_{rr}(f)$ are provided to, or are accessible in a memory to, the MVDR beamformer. The coherences here may be considered to be normalized covariances.

Referring now to FIG. 7, the use of the covariance estimates at the MVDR beamformer will be explained. An example process 700 for a computer-implemented method of acoustic dereverberation factoring the actual acoustic environment is provided, and particularly including MVDR beamforming. In the illustrated implementation, process 700 may include one or more operations, functions or actions as illustrated by one or more of operations 702 to 716 generally numbered evenly. By way of non-limiting example, process 700 may be described with reference to example audio signal processing devices described herein with any of FIGS. 1-4 and 12, and where relevant.

Process 700 may include "obtain WPE outputs and estimated coherences for MVDR beamforming" 702, and as already mentioned above, this may include access to the values in a memory. The memory may be in any form that is practical for the uses herein.

Process 700 may include "generate dereverberation coefficients to reduce residual reverberation" 704. In more detail, a covariance whitening (CW) method for RTF estimation has been disclosed by S. Markovich-Golan, et al., "Multichannel Eigenspace beamforming in a reverberant noisy environment with multiple interfering speech signals," IEEE Trans. Audio, Speech and Language Processing, vol. 17, no. 6, pp. 1071-1086, August 2009; A. Bertrand and M. Moonen, "Distributed node-specific LCMV beamforming in wireless sensor networks," IEEE Transactions on Signal Processing, vol. 60, pp. 233-246, January 2012; and S. Markovich-Golan and S. Gannot, "Performance analysis of the covariance subtraction method for relative transfer function estimation and comparison to the covariance whitening method," in 2015 IEEE International Conference on Acoustics, Speech and Signal Processing (ICASSP). IEEE, 2015, pp. 544-548. Here, these have been modified to estimate the RTF of the early component and including the coherence estimate based, at least in part, on the actual acoustic environment, by:

$$g_0(f)=\frac{\Phi_{rr}^{\frac{1}{2}}(f)q(f)}{e_1^H\Phi_{rr}^{\frac{1}{2}}(f)q(f)}, \tag{24}$$

where the operator $(\bullet)^{1/2}$ denotes the Cholesky decomposition, q(f) is the principal Eigenvector of the matrix:

$$\Phi_{rr}^{-\frac{1}{2}}(f)\hat{\Phi}_{yy}(f)\left(\Phi_{rr}^{-\frac{1}{2}}(f)\right)^H \tag{25}$$

where $e_1\triangleq[1,0,\ldots,0]^T$ from the RTF equation (23) is a selection vector, and $\hat{\Phi}_{yy}(f)$ is an estimate for the long-term averaged covariance matrix of the WPE output signal y(n, f) in the frequency domain. Note that the selection vector $e_1$, is used to defined the reference microphone, here selected as the first microphone. This selection determines the desired signal as the early speech component at the first microphone.

Thus, process 700 may include "estimate long-term covariance averaging of WPE outputs" 706, and particularly to perform the same (or very similar) covariance averaging to y(n, f) WPE outputs as was applied to the reverberation values in $\hat{r}(n, f)$ to compute $\hat{\Phi}_{yy}(f)$.

Process 700 also may include "determine Eigenvector" 708 by applying equation 24 above followed by an eigenvalue decomposition (EVD) to determine q(f), and "generate the relative transfer function" 710 by now computing $g_0(f)$ since q(f) is already computed.

Now that all of the components are determined for computing the dereverberation coefficients, process 700 then may include "compute residual dereverberation coefficients" 712. Thus, the MVDR (or dereverberation coefficients) in the second stage, denoted $w_r(f)$ is computed by:

$$w_r(f)\triangleq\frac{\Phi_{rr}^{-1}(f)\hat{g}_0(f)}{g_o^H(f)\Phi_{rr}^{-1}(f)\hat{g}_0(f)} \tag{26}$$

where $w_r(f)$ is a M dimensional vector of coefficients per frequency.

Process 700 then may include "apply coefficients to WPE output" 714 so that the $w_r(f)$ coefficients are applied to WPE output signals y(n, f) of the same frequency bin, and over each time frame n in that frequency bin. The same coefficients are applied to each or individual frames of output signals forming a multi-input, single-output (MISO) system. This is repeated for each frequency bin. The result is an enhanced output signal with the reverberant or middle component of the IR removed by WPE filtering, and the last or residual reverberant component removed by the MVDR beamforming.

Process 700 then may include "convert output to time domain" 716, and to provide applications with time domain audio data when desired.

By other alternatives, it will be appreciated that the methods herein are not always necessarily limited to all specific operations of a WPE filtering and/or an MVDR beamformer. For example, by one form a computer-implemented method of acoustic dereverberation comprises receiving, by at least one processor, multiple audio signals comprising dry audio signals divided into time-frames and contaminated by reverberations formed by objects in or forming the actual acoustic environment wherein the reverberations comprise reverberation components and residual reverberation components. Then this method may include de-correlating, by at least one processor, past time-frames from a current time-frame to generate multichannel estimates of residual reverberations. Thereafter, the method may include performing, by at least one processor, post-filtering by generating an interference matrix using the multichannel estimates of residual reverberations. WPE is one example of such a de-correlating process. The MVDR beamformer described above performs one example of such generation of an interference matrix.

Likewise, another method may include receiving, by at least one processor, multiple audio signals comprising dry audio signals contaminated by reverberations formed by objects in or forming an actual acoustic environment wherein the reverberations comprise reverberation components and residual reverberation components. This method then may include performing, by at least one processor, dereverberation using filtering forming an output signal associated with the dry audio signals and comprising removing at least some of the reverberation components wherein the output signal still has at least some of the residual reverberation components. The method then may include forming, by at least one processor, a multichannel estimate of at least the residual reverberation components. These first stage operations may be performed by WPE or other algorithms. The method then may include reducing, by at least one processor, the residual reverberation components in the output signal comprising applying post filtering that uses the multichannel estimate of the residual reverberation components. This second stage may use MVDR beamformer or other algorithms. Many other variations are contemplated.

Referring to FIGS. 8-11, the modeling of the coherence of the residual reverberant component at the output of the first stage WPE algorithm, c(n, f), as the coherence of a diffuse noise field was shown in the following experimentation. One way to measure the effectiveness of the dereverberation methods for improving speech intelligibility is word error rate (WER). Then, the performance of the proposed algorithm is evaluated and compared to the unprocessed signal and to the output of the first stage WPE.

A transcribed 5 min dry speech recording, at a sampling rate of 16 KHz, is filtered through simulated IRs, generated according to the image model. A circular array with a diameter of 10 cm comprising M=8 microphones is placed at the center of a 7 m×7 m×3 m simulated room. Two reverberation times (RTs), 0.4 s and 0.6 s from the start of the audio sequence, are compared. The microphones were spaced 9.3 cm from each other.

Diffuse Model Verification

Figure 8:
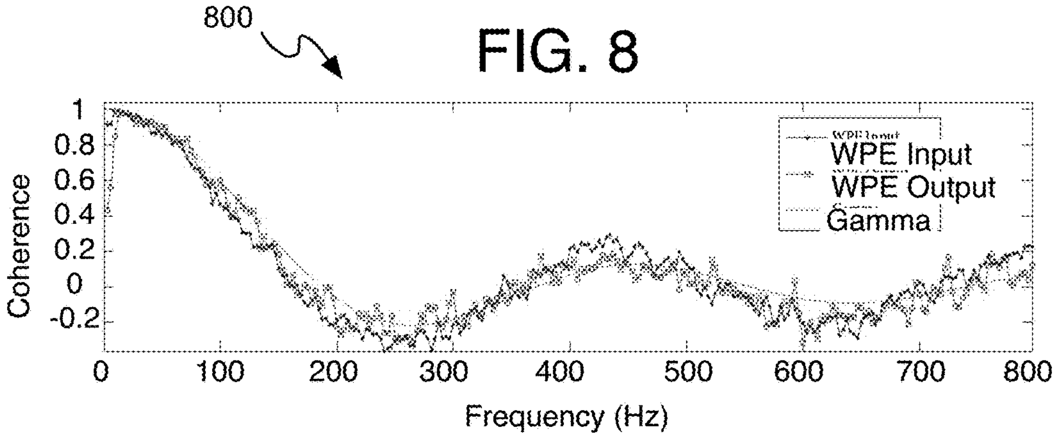
FIG. 8 is a graph of the coherence of reverberant components input at the microphones and output of a weighted prediction error (WPE) dereverberation, and coherence to a theoretical diffuse field.

Referring to FIG. 8, in order to verify the diffuse noise statistical model for the residual reverberant component, the spatial coherence matrix of c(n, f) was examined. The coherence is averaged over 50 different positions of the speech source, uniformly spaced on a 2 m circle around the microphone array. The empirical average coherence for each pair of signals, taken from the reverberant components at either the microphones or at the output of the first stage WPE, and the respective theoretical diffuse field coherence are compared. An example for the average coherence between a pair of microphones at a distance of 9.3 cm with RT of 0.4 s is depicted in graph 800. Clearly from this figure, all three coherence measures match closely, namely:

1) of the reverberant component at the microphones, r(n, f);

2) of the residual reverberant component at the output of the first stage WPE, c(n, f); and 3) of an ideal diffuse noise field. A similar match is obtained for all tested microphone pairs and RTs.

Performance Evaluation

The performance measures of different stages of the proposed method were evaluated and compared, namely:

1) the unprocessed reference microphone signal, $x_1$;

2) the output of the first stage WPE, $y_1$;

3) the output of the final stage (MVDR), $\hat{d}$.

The following performance criteria were tested: cepstral distortion (CD), direct SRR and WER. For the CD and SRR criteria, the desired signal is defined as the early speech component, $\hat{d}(n)$.

The ASR engine used for the experiments is a conventional continuous large-vocabulary speech recognizer which has been developed in Intel. The acoustic models are trained using the Kaldi open source toolkit and the language model has been estimated with the MIT language modeling toolkit. Acoustic or language models have not been optimized or tuned for the test data.

The performance is evaluated for speaker to microphone array distances selected from {1 m; 2 m; 3 m} and for RT selected from {0.4 s, 0.6 s}. The results are summarized in Table. 1 below.

| RT/ | WER [%] | | | SRR [dB] | | | CD [dB] | | |
|---|---|---|---|---|---|---|---|---|---|
| Stage | 1 m | 2 m | 3 m | 1 m | 2 m | 3 m | 1 m | 2 m | 3 m |
| RT 0.4 s | | | | | | | | | |
| Mic. | 11.2 | 21.3 | 19.8 | 6.6 | 2.2 | −0.2 | 3 | 3.8 | 3.9 |
| WPE | 4.6 | 9.6 | 10.6 | 18.8 | 12 | 4.4 | 1.9 | 2.7 | 3.1 |
| Final | 3.5 | 7.1 | 7.6 | 21.7 | 14.1 | 8 | 1.5 | 2.2 | 2.5 |
| RT | 0.6 s | | | | | | | | |
| 0.6 s | | | | | | | | | |
| Mic. | 20.3 | 35.5 | 37 | 2.9 | −1.4 | −3.7 | 3.6 | 4.2 | 4.2 |
| WPE | 7.1 | 15.7 | 13.3 | 11.9 | 4.4 | 0.4 | 2.3 | 3.2 | 3.4 |
| Final | 5.6 | 7.1 | 10.6 | 14.6 | 7.6 | 2.2 | 1.7 | 2.4 | 2.6 |

Figure 9:
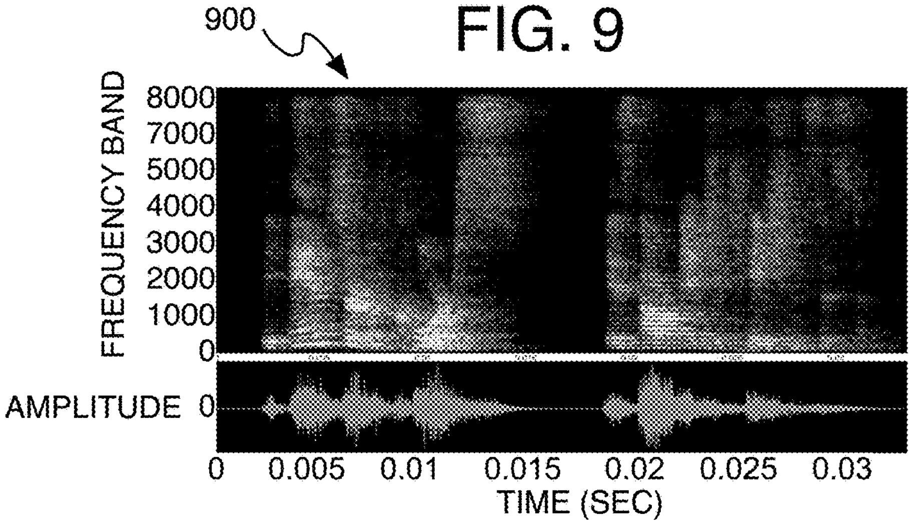
FIG. 9 is an image of a spectrogram of a signal from the input of a microphone array showing reverberations and to be used with implementations described herein.
Figure 10:
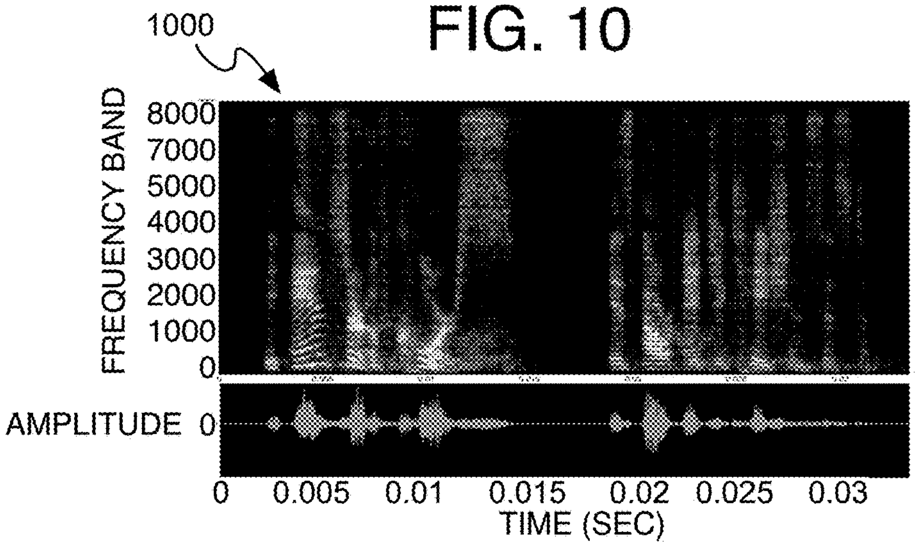
FIG. 10 is an image of a spectrogram of the signal of FIG. 9 outputted at a WPE showing residual reverberations and according to the implementations described herein.
Figure 11:
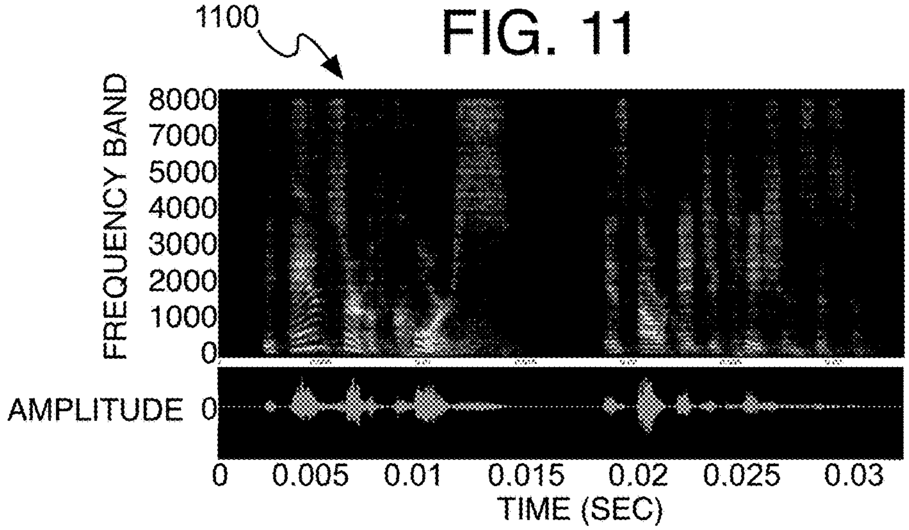
FIG. 11 is an image of a spectrogram of the signal of FIG. 9 outputted at a MVDR showing reduced residual reverberations and according to the implementations described herein.

Referring to FIGS. 9-11, evidently, from this summary, the performance in terms of all tested criteria is improved by using the proposed algorithm. Spectrograms at different stages of the proposed method for a source-array distance of 2 m and a RT of 0.4 s are depicted as an example in spectrograms 900, 1000, and 1100 in FIGS. 9-11. Spectrograms 900, 1000, and 1100 respectively show the signals at the microphone, the output of first stage WPE, and the output of second stage MVDR. It is evident from these spectrograms that the output of the proposed system contains less reverberations than the first stage WPE method and the reference microphone. In these spectrograms reverberations are manifested as smearing of the speech spectrogram along the time-axis (x axis). The sharper the spectrogram is with clear dark area boundaries, and the shorter the "tailing" power after speech segments, the less reverberant is the speech, It will be appreciated that processes 500, 600, and/or 700 may be provided by sample audio processing systems 200, 300, 400, and/or 1200 to operate at least some implementations of the present disclosure. In addition, any one or more of the operations of the processes of FIGS. 5-7 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 12:
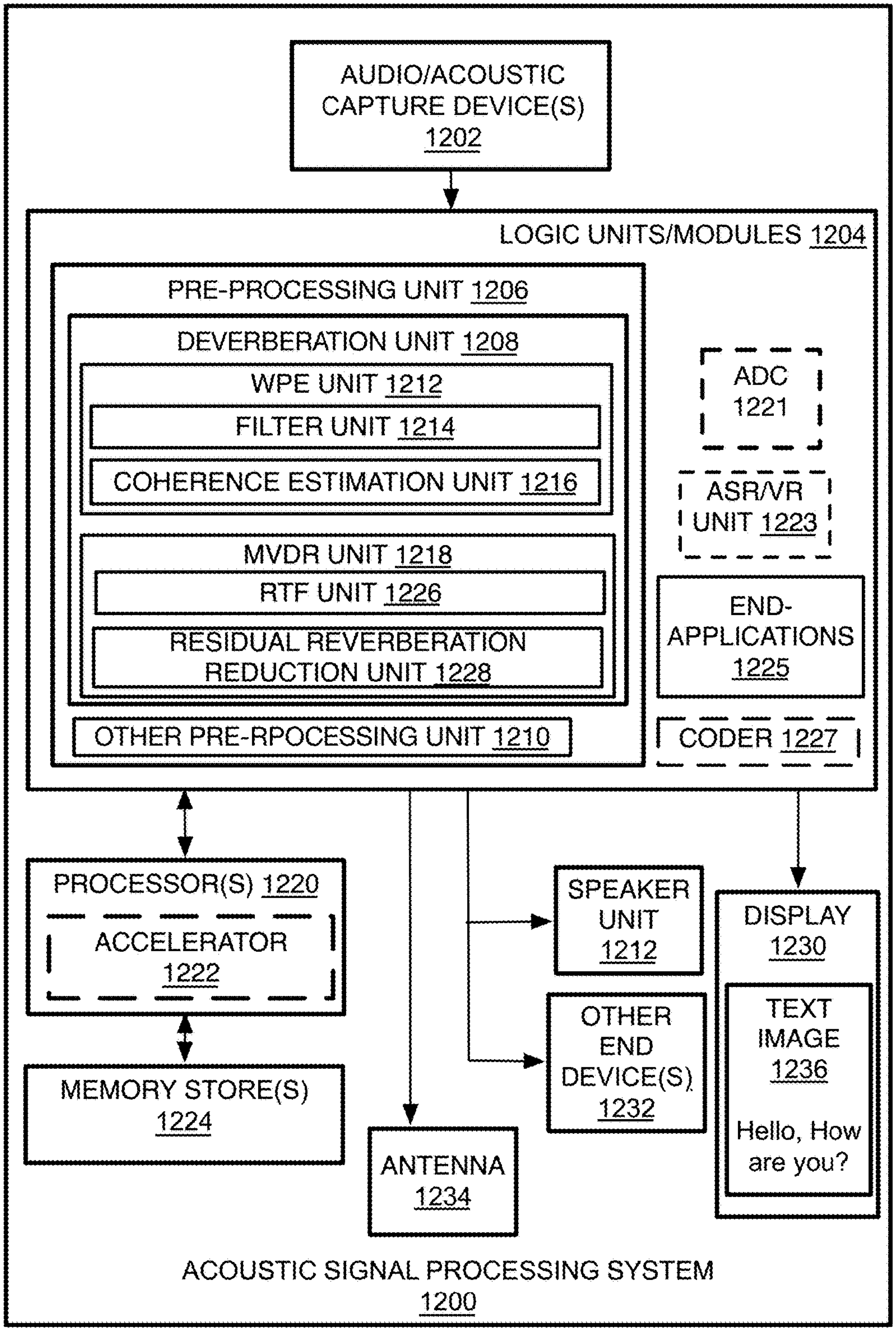
FIG. 12 is an illustrative diagram of an example system.

Referring to FIG. 12, an example acoustic signal processing system 1200 is arranged in accordance with at least some implementations of the present disclosure. In various implementations, the example acoustic signal processing system 1200 may have an audio/acoustic capture device(s) 1202 to form or receive acoustical signal data. This can be implemented in various ways. Thus, in one form, the acoustic signal processing system 1200 is a device, or is on a device, with one or more microphones. In other examples, the acoustic signal processing system 1200 may be in communication with one or a network of microphones, and may be remote from these acoustic signal capture devices such that logic modules 1204 may communicate remotely with, or otherwise may be communicatively coupled to, the microphones for further processing of the acoustic data.

In either case, such technology may include a telephone, a smart phone, a tablet, laptop or other computer, dictation machine, other sound recording machine, a mobile device or an on-board device, or any combination of these. Thus, in one form, audio capture device 1202 may include audio capture hardware including one or more sensors as well as actuator controls. These controls may be part of a sensor module or component for operating the sensor. The sensor component may be part of the audio capture device 1202, or may be part of the logical modules 1204 or both. Such sensor component can be used to convert sound waves into an electrical acoustic signal. The audio capture device 1202 also may have an A/D converter, other filters, and so forth to provide a digital signal for acoustic signal processing.

In the illustrated example, the logic modules 1204 may include an analog digital conversion (ADC) unit 1221 to support any A/D convertor on the audio capture device 1202, or to provide the function when not already provided, and if needed. The logic modules 1204 also may have a pre-processing unit 1206 that has a dereverberation unit 1208 and an other pre-processing unit 1210 to handle all other pre-processing non-dereverberation tasks as described above. The dereverberation unit 1208 may have a WPE unit 1212 with a filtering unit 1214 to perform the filtering of reverberant components of an IR and a coherence estimation unit 1216 that computes reverberations and estimates coherences as described above. An MVDR unit 1218 has an RTF unit 1226 to compute the relative transfer functions (RTFs) using the estimated coherences, and a residual reverberation reduction unit 1228 to apply the coefficients. An ASR/VR unit 1223 may be provided for speech or voice recognition when desired, and end applications 1225 may be provided to use the output audio signals in one or more ways also as described above. The logic modules 1204 also may include a coder 1227 to encode the output signals for transmission. These units may be used to perform the operations described above where relevant.

The acoustic signal processing system 1200 may have one or more processors 1220 which may include a dedicated accelerator 1222 such as the Intel Atom, memory stores 1224, at least one speaker unit 1212 to emit audio based on the input acoustic signals, one or more displays 1230 to provide images 1236 of text, for example, as a visual response to the acoustic signals, other end device(s) 1232 to perform actions in response to the acoustic signal, and antenna 1234. In one example implementation, the speech processing system 1200 may have the display 1230, at least one processor 1220 communicatively coupled to the display, and at least one memory 1224 communicatively coupled to the processor. The antenna 1234 may be provided to transmit the output signals or other relevant commands to other devices that may use the output signals. Otherwise, the results of the output signals may be stored in memory 1224. As illustrated, any of these components may be capable of communication with one another and/or communication with portions of logic modules 1204 and/or audio capture device 1202. Thus, processors 1220 may be communicatively coupled to the audio capture device 1202, the logic modules 1204, and the memory 1224 for operating those components.

Although acoustic signal processing system 1200, as shown in FIG. 12, may include one particular set of blocks or actions associated with particular components or modules, these blocks or actions may be associated with different components or modules than the particular component or module illustrated here.

Figure 13:
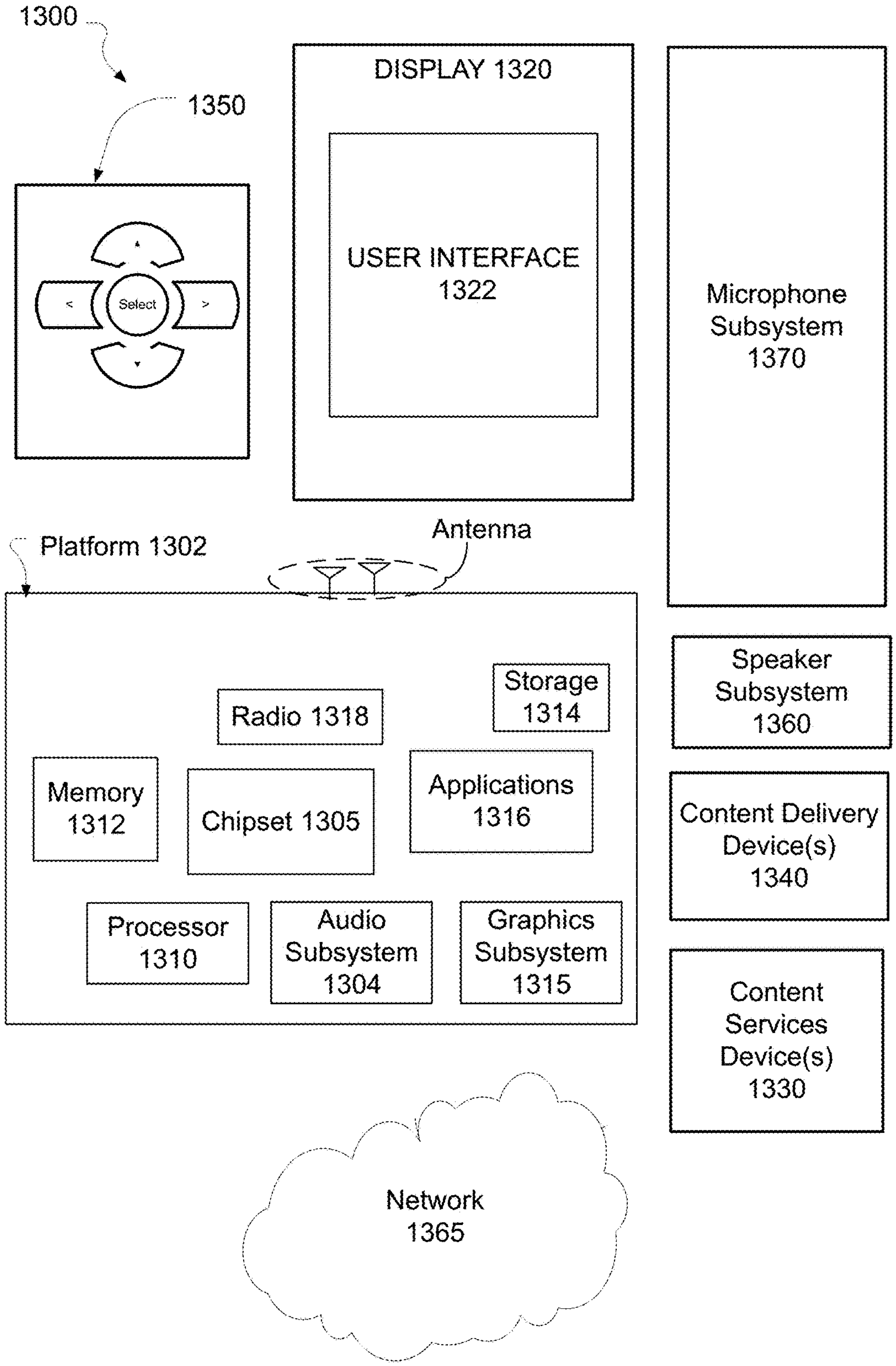
FIG. 13 is an illustrative diagram of another example system.

Referring to FIG. 13, an example system 1300 in accordance with the present disclosure operates one or more aspects of the speech processing system described herein. It will be understood from the nature of the system components described below that such components may be associated with, or used to operate, certain part or parts of the speech processing system described above. In various implementations, system 1300 may be a media system although system 1300 is not limited to this context. For example, system 1300 may be incorporated into multiple microphones of a network of microphones, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, but otherwise any device having a network of acoustic signal producing devices.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302, speaker subsystem 1360, microphone subsystem 1370, and/or display 1320. Each of these components is described in greater detail below.

In various implementations, platform 1302 may include any combination of a chipset 1305, processor 1310, memory 1312, storage 1314, audio subsystem 1304, graphics subsystem 1315, applications 1316 and/or radio 1318. Chipset 1305 may provide intercommunication among processor 1310, memory 1312, storage 1314, audio subsystem 1304, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Audio subsystem 1304 may perform processing of audio such as acoustic signals for speech recognition as described herein and/or voice recognition. The audio subsystem 1304 may comprise one or more processing units, memories, and accelerators. Such an audio subsystem may be integrated into processor 1310 or chipset 1305. In some implementations, the audio subsystem 1304 may be a stand-alone card communicatively coupled to chipset 1305. An interface may be used to communicatively couple the audio subsystem 1304 to a speaker subsystem 1360, microphone subsystem 1370, and/or display 1320.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, Display Port, wireless HDMI, and/or wireless HD compliant techniques. Graphics subsystem 1315 may be integrated into processor 1310 or chipset 1305. In some implementations, graphics subsystem 1315 may be a stand-alone card communicatively coupled to chipset 1305.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320, speaker subsystem 1360, and microphone subsystem 1370. Platform 1302 and/or content services device(s) 1330 may be coupled to a network 1365 to communicate (e.g., send and/or receive) media information to and from network 1365. Content delivery device(s) 1340 also may be coupled to platform 1302, speaker subsystem 1360, microphone subsystem 1370, and/or to display 1320.

In various implementations, content services device(s) 1330 may include a network of microphones, a cable television box, personal computer, network, telephone, Internet enabled devices or appliance capable of delivering digital information and/or content, and any other similar device capable of unidirectionally or bidirectionally communicating content between content providers and platform 1302 and speaker subsystem 1360, microphone subsystem 1370, and/or display 1320, via network 1365 or directly. It will be appreciated that the content may be communicated unidirectionally and/or bidirectionally to and from any one of the components in system 1300 and a content provider via network 1365. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1304 also may be used to control the motion of articles or selection of commands on the interface 1322.

Movements of the navigation features of controller 1350 may be replicated on a display (e.g., display 1320) by movements of a pointer, cursor, focus ring, or other visual indicators displayed on the display or by audio commands. For example, under the control of software applications 1316, the navigation features located on navigation controller 1350 may be mapped to virtual navigation features displayed on user interface 1322, for example. In embodiments, controller 1350 may not be a separate component but may be integrated into platform 1302, speaker subsystem 1360, microphone subsystem 1370, and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example, or by auditory command. Program logic may allow platform 1302 to stream content to media adaptors or other content services device(s) 1330 or content delivery device(s) 1340 even when the platform is turned "off" In addition, chipset 1305 may include hardware and/or software support for 8.1 surround sound audio and/or high definition (7.1) surround sound audio, for example. Drivers may include an auditory or graphics driver for integrated auditory or graphics platforms. In embodiments, the auditory or graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302, speaker subsystem 1360, microphone subsystem 1370, and/or display 1320 may be an integrated unit. Display 1320, speaker subsystem 1360, and/or microphone subsystem 1370 and content service device(s) 1330 may be integrated, or display 1320, speaker subsystem 1360, and/or microphone subsystem 1370 and content delivery device(s) 1340 may be integrated, for example. These examples are not meant to limit the present disclosure.

In various implementations, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Figure 14:
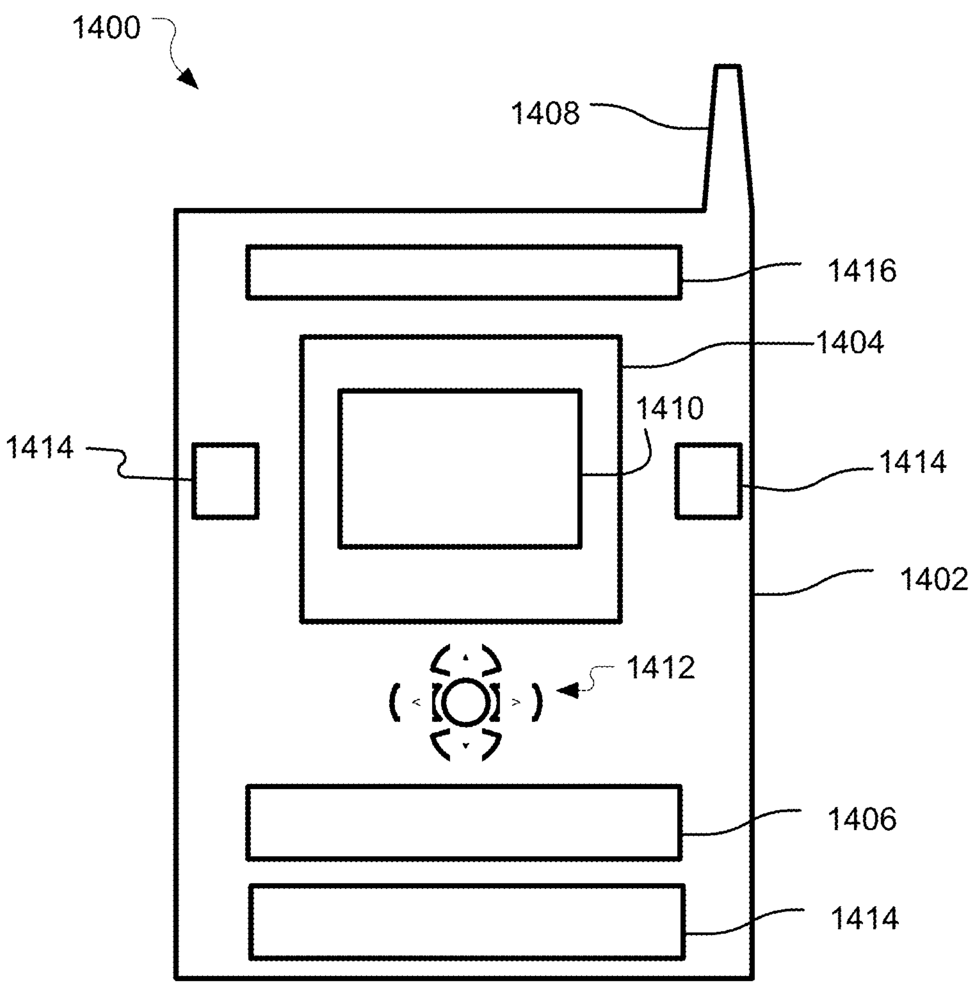
FIG. 14 illustrates another example device, all arranged in accordance with at least some implementations of the present disclosure.

Referring to FIG. 14, a small form factor device 1400 is one example of the varying physical styles or form factors in which system 1200 may be embodied. By this approach, device 1400 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, speaker system, microphone system or network, and so forth, and any other on-board (such as on a vehicle), or building, computer that may accept audio commands.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may include a housing 1402, a display 1404 including a screen 1410, an input/output (I/O) device 1406, and an antenna 1408. Device 1400 also may include navigation features 1412. Display 1404 may include any suitable display unit for displaying information appropriate for a mobile computing device. I/O device 1406 may include any suitable I/O device for entering information into a mobile computing device. Examples for I/O device 1406 may include an alphanumeric keyboard, a numeric keypad, a touch pad, input keys, buttons, switches, rocker switches, software and so forth. Information also may be entered into device 1400 by way of network of two or more microphones 1414. Such information may be processed by an acoustic signal mixing device as described herein as well as a speech and/or voice recognition devices and as part of the device 1400, and may provide audio responses via a speaker 1416 or visual responses via screen 1410. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of acoustic dereverberation comprises receiving, by at least one processor, multiple audio signals comprising dry audio signals contaminated by reverberations formed by objects in or forming an actual acoustic environment wherein the reverberations comprise reverberation components and residual reverberation components; performing, by at least one processor, dereverberation using weighted prediction error (WPE) filtering forming an output signal associated with the dry audio signals and comprising removing at least some of the reverberation components wherein the output signal still has at least some of the residual reverberation components; forming, by at least one processor, a multichannel estimate of at least the reverberation components; estimating, by at least one processor, multichannel coherence of the multichannel estimate of the reverberation components; and reducing, by at least one processor, the residual reverberation components in the output signal comprising applying a minimum variance distortionless response (MVDR) beamformer and based, at least in part, on the estimate of the coherence.

Otherwise, the method may include that comprising performing automatic speech or speaker recognition using a resulting enhanced speech signal after application of the MVDR beamformer, wherein estimating coherence comprises generating long-term covariance averages associated with the reverberation components, and wherein operating the MVDR beamformer comprises using a long-term averaged covariance matrix based on the estimated reverberation components for estimating the relative transfer functions of the early components in a relative transfer function to form spatial filter coefficients for reducing the residual reverberation. The method also comprises using an infinite impulse response (IIR) related function to perform, at least in part, the covariance averaging, wherein estimating the reverberation components comprises forming a matrix wherein each row or column is associated with a different microphone and the other of the rows or columns each is associated with a different frequency bin in a frequency domain. The method may further comprise forming a covariance matrix of each frequency bin row or column, estimating the coherence comprising performing long-term averaging of instantaneous covariance matrices of individual frames of the same frequency bin, and repeating with individual frequency bins, wherein the long-term averaging comprises adjusting covariance values relative to a previous covariance matrix of a previous frame time n−1 using an infinite impulse response filtering function, and using the MVDR beamformer to generate a vector of residual reverberation coefficients to be applied to output signals of an individual frequency bin.

By yet another method, a computer-implemented method of automatic speech or speaker recognition comprises receiving, by at least one processor, multiple audio signals comprising audio signals of human speech contaminated by reverberations formed by objects in or forming an actual acoustic environment, wherein the reverberations comprise reverberation components and residual reverberation components; pre-processing comprising dereverberation of at least a sub-band of the audio signals and comprising: performing, by at least one processor, dereverberation using weighted prediction error (WPE) filtering forming an output signal associated with the dry audio signals and comprising removing at least some of the reverberation components wherein the output signal still has at least some of the residual reverberation components; forming, by at least one processor, a multichannel estimate of at least the reverberation components; estimating, by at least one processor, multichannel coherence of the multichannel estimate of the reverberation components; and reducing, by at least one processor, the residual reverberation components in the output signal comprising applying a minimum variance distortionless response (MVDR) beamformer and based, at least in part, on the estimate of the coherence; and analyzing the pre-processed audio data to recognize words in the speech or match the acoustic signal of the audio data to recognized voice signals.

Otherwise, this method may comprise wherein estimating coherence comprises generating long-term covariance averages of the reverberation components, wherein the acoustic environment as indicated by the reverberations comprises at least one of: interiorly facing surfaces defining at least part of the sides of the acoustic environment, physical objects within the acoustic environment, variations in frequency responses by at least one microphone receiving acoustic waves in the acoustic environment, the physical location of at least one microphone receiving acoustic waves in the acoustic environment, and existence of at least one non-reverberation field. wherein operating the MVDR beamformer comprises estimating a steering vector of an early speech component comprising using covariance whitening (CW).

By yet another implementation, a computer-implemented system of acoustic dereverberation comprises at least two microphones to receive at least two acoustic signals in an actual acoustic environment; at least one processor communicatively connected to the at least two microphones; at least one memory communicatively coupled to the at least one processor; and a dereverberation unit operated by the at least one processor and to operate by: receiving, by at least one processor, multiple audio signals comprising dry audio signals contaminated by reverberations formed by objects in or forming the actual acoustic environment wherein the reverberations comprise reverberation components and residual reverberation components; performing, by at least one processor, dereverberation using weighted prediction error (WPE) filtering forming an output signal associated with the dry audio signals and comprising removing at least some of the reverberation components wherein the output signal still has at least some of the residual reverberation components; forming, by at least one processor, a multichannel estimate of at least the reverberation components; estimating, by at least one processor, multichannel coherence of the multichannel estimate of the reverberation components; and reducing, by at least one processor, the residual reverberation components in the output signal comprising applying a minimum variance distortionless response (MVDR) beamformer and based, at least in part, on the estimate of the coherence.

By another example, the system provides that wherein estimating coherence comprises generating long-term covariance averages associated with the reverberation components, and wherein each estimate of a coherence is provided for individual frequency bins in a frequency domain, wherein estimating the reverberation components comprises forming a reverberation components matrix wherein each row or column is associated with a different microphone and the other of the rows or columns each is associated with a different frequency bin in a frequency domain, wherein estimating coherence comprises forming a covariance matrix of each frequency bin row or column, and averaging instantaneous covariance matrices over the time frames per frequency-bin, wherein operating the MVDR beamformer comprises using a long-term averaged covariance matrix based on the reverberation components for estimating the relative transfer functions (RTFs) in a relative transfer function to form a spatial-filter for reducing the residual reverberation, wherein operating the MVDR beamformer comprises estimating a steering vector of an early speech component comprising using covariance whitening (CW) in a relative transform function (RTF), wherein reducing the residual reverberation comprises forming residual reverberation coefficients of individual frequency bins and based, at least in part, on estimated coherence of the initial reverberations to a diffuse field of at least one microphone, wherein the actual acoustic environment as indicated by the estimated reverberations comprising at least one of: interiorly facing surfaces defining at least part of the sides of the acoustic environment, physical objects within the acoustic environment, variations in frequency response by at least one microphone receiving acoustic waves in the acoustic environment, the physical location of at least one microphone receiving acoustic waves in the acoustic environment, and existence of at least one non-reverberation field.

By yet another form, a computer-implemented method of acoustic dereverberation comprises receiving, by at least one processor, multiple audio signals comprising dry audio signals divided into time-frames and contaminated by reverberations formed by objects in or forming the actual acoustic environment wherein the reverberations comprise reverberation components and residual reverberation components; de-correlating, by at least one processor, past time-frames from a current time-frame to generate multichannel estimates of residual reverberations; and performing, by at least one processor, post-filtering by generating an interference matrix using the multichannel estimates of residual reverberations.

By one other approach, at least one computer readable medium comprises a plurality of instructions that in response to being executed on a computing device, causes the computing device to operate by: receiving, by at least one processor, multiple audio signals comprising dry audio signals contaminated by reverberations formed by objects in or forming an actual acoustic environment wherein the reverberations comprise reverberation components and residual reverberation components; performing, by at least one processor, dereverberation using filtering forming an output signal associated with the dry audio signals and comprising removing at least some of the reverberation components wherein the output signal still has at least some of the residual reverberation components; forming, by at least one processor, a multichannel estimate of at least the residual reverberation components; and reducing, by at least one processor, the residual reverberation components in the output signal comprising applying post filtering that uses the multichannel estimate of the residual reverberation components.

By another approach, the instructions include that wherein estimating the reverberation components comprises forming a matrix wherein each row or column is associated with a different microphone and the other of the rows or columns each is associated with a different frequency bin in a frequency domain, the instructions causing the computing device to operate by: forming a covariance matrix of each frequency bin row or column; and estimating the coherence comprising performing long-term averaging of the instantaneous covariance matrices per frequency bin; wherein the long-term averaging comprises using an infinite impulse response filtering function.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of acoustic dereverberation comprising:

receiving, by at least one processor, multiple audio signals comprising dry audio signals contaminated by reverberations formed by objects in or forming an actual acoustic environment wherein the reverberations comprise reverberation components and residual reverberation components;

performing, by at least one processor, dereverberation using weighted prediction error (WPE) filtering forming an output signal associated with the dry audio signals and comprising removing at least some of the reverberation components wherein the output signal still has at least some of the residual reverberation components;

forming, by at least one processor, a multichannel estimate of at least the reverberation components;

estimating, by at least one processor, multichannel coherence of the multichannel estimate of the reverberation components; and reducing, by at least one processor, the residual reverberation components in the output signal comprising applying a minimum variance distortionless response (MVDR) beamformer and based, at least in part, on the estimate of the coherence.

2. The method of claim 1 comprising performing automatic speech or speaker recognition using a resulting enhanced speech signal after application of the MVDR beamformer.

3. The method of claim 1 wherein estimating coherence comprises generating long-term covariance averages associated with the reverberation components.

4. The method of claim 3 wherein operating the MVDR beamformer comprises using a long-term averaged covariance matrix based on the estimated reverberation components for estimating the relative transfer functions of the early components in a relative transfer function to form spatial filter coefficients for reducing the residual reverberation.

5. The method of claim 4 comprising using an infinite impulse response (IIR) related function to perform, at least in part, the covariance averaging.

6. The method of claim 1 wherein estimating the reverberation components comprises forming a matrix wherein each row or column is associated with a different microphone and the other of the rows or columns each is associated with a different frequency bin in a frequency domain.

7. The method of claim 6 comprising forming a covariance matrix of each frequency bin row or column.

8. The method of claim 6 comprising estimating the coherence comprising performing long-term averaging of instantaneous covariance matrices of individual frames of the same frequency bin, and repeating with individual frequency bins.

9. The method of claim 8 wherein the long-term averaging comprises adjusting covariance values relative to a previous covariance matrix of a previous frame time n−1 using an infinite impulse response filtering function.

10. The method of claim 1 comprising using the MVDR beamformer to generate a vector of residual reverberation coefficients to be applied to output signals of an individual frequency bin.

11. A method of automatic speech or speaker recognition, comprising:

receiving, by at least one processor, multiple audio signals comprising audio signals of human speech contaminated by reverberations formed by objects in or forming an actual acoustic environment, wherein the reverberations comprise reverberation components and residual reverberation components;

pre-processing comprising dereverberation of at least a sub-band of the audio signals and comprising:

performing, by at least one processor, dereverberation using weighted prediction error (WPE) filtering forming an output signal associated with the dry audio signals and comprising removing at least some of the reverberation components wherein the output signal still has at least some of the residual reverberation components;

forming, by at least one processor, a multichannel estimate of at least the reverberation components;

estimating, by at least one processor, multichannel coherence of the multichannel estimate of the reverberation components; and reducing, by at least one processor, the residual reverberation components in the output signal comprising applying a minimum variance distortionless response (MVDR) beamformer and based, at least in part, on the estimate of the coherence; and analyzing the pre-processed audio data to recognize words in the speech or match the acoustic signal of the audio data to recognized voice signals.

12. The method of claim 11 wherein estimating coherence comprises generating long-term covariance averages of the reverberation components.

13. The method of claim 11 wherein the acoustic environment as indicated by the reverberations comprises at least one of:

interiorly facing surfaces defining at least part of the sides of the acoustic environment, physical objects within the acoustic environment, variations in frequency responses by at least one microphone receiving acoustic waves in the acoustic environment, the physical location of at least one microphone receiving acoustic waves in the acoustic environment, and existence of at least one non-reverberation field.

14. The method of claim 11, wherein operating the MVDR beamformer comprises estimating a steering vector of an early speech component comprising using covariance whitening (CW).

15. A computer-implemented system of audio processing, comprising:

at least two microphones to receive at least two acoustic signals in an actual acoustic environment;

at least one processor communicatively connected to the at least two microphones;

at least one memory communicatively coupled to the at least one processor; and a dereverberation unit operated by the at least one processor and to operate by:

receiving, by at least one processor, multiple audio signals comprising dry audio signals contaminated by reverberations formed by objects in or forming the actual acoustic environment wherein the reverberations comprise reverberation components and residual reverberation components;

performing, by at least one processor, dereverberation using weighted prediction error (WPE) filtering forming an output signal associated with the dry audio signals and comprising removing at least some of the reverberation components wherein the output signal still has at least some of the residual reverberation components;

forming, by at least one processor, a multichannel estimate of at least the reverberation components;

estimating, by at least one processor, multichannel coherence of the multichannel estimate of the reverberation components; and reducing, by at least one processor, the residual reverberation components in the output signal comprising applying a minimum variance distortionless response (MVDR) beamformer and based, at least in part, on the estimate of the coherence.

16. The system of claim 15 wherein estimating coherence comprises generating long-term covariance averages associated with the reverberation components, and wherein each estimate of a coherence is provided for individual frequency bins in a frequency domain.

17. The system of claim 15 wherein estimating the reverberation components comprises forming a reverberation components matrix wherein each row or column is associated with a different microphone and the other of the rows or columns each is associated with a different frequency bin in a frequency domain.

18. The method of claim 17 wherein estimating coherence comprises forming a covariance matrix of each frequency bin row or column, and averaging instantaneous covariance matrices over the time frames per frequency-bin.

19. The system of claim 15 wherein operating the MVDR beamformer comprises using a long-term averaged covariance matrix based on the reverberation components for estimating the relative transfer functions (RTFs) in a relative transfer function to form a spatial-filter for reducing the residual reverberation.

20. The system of claim 15 wherein operating the MVDR beamformer comprises estimating a steering vector of an early speech component comprising using covariance whitening (CW) in a relative transform function (RTF).

21. The system of claim 15 wherein reducing the residual reverberation comprises forming residual reverberation coefficients of individual frequency bins and based, at least in part, on estimated coherence of the reverberations to a diffuse field of at least one microphone.

22. The system of claim 19 wherein the actual acoustic environment as indicated by the estimated reverberations comprising at least one of:

interiorly facing surfaces defining at least part of the sides of the acoustic environment, physical objects within the acoustic environment, variations in frequency response by at least one microphone receiving acoustic waves in the acoustic environment, the physical location of at least one microphone receiving acoustic waves in the acoustic environment, and existence of at least one non-reverberation field.

23. At least one computer readable medium comprising a plurality of instructions that in response to being executed on a computing device, causes the computing device to operate by:

receiving, by at least one processor, multiple audio signals comprising dry audio signals contaminated by reverberations formed by objects in or forming an actual acoustic environment wherein the reverberations comprise reverberation components and residual reverberation components;

performing, by at least one processor, dereverberation using filtering forming an output signal associated with the dry audio signals and comprising removing at least some of the reverberation components wherein the output signal still has at least some of the residual reverberation components;

forming, by at least one processor, a multichannel estimate of at least the residual reverberation components; and reducing, by at least one processor, the residual reverberation components in the output signal comprising applying post filtering that uses the multichannel estimate of the residual reverberation components.

24. The medium of claim 23, wherein estimating the reverberation components comprises forming a matrix wherein each row or column is associated with a different microphone and the other of the rows or columns each is associated with a different frequency bin in a frequency domain, the instructions causing the computing device to operate by:

forming a covariance matrix of each frequency bin row or column; and estimating the coherence comprising performing long-term averaging of the instantaneous covariance matrices per frequency bin;

wherein the long-term averaging comprises using an infinite impulse response filtering function.

* * * * *